United States Patent
Ande et al.

(10) Patent No.: US 8,700,440 B1
(45) Date of Patent: *Apr. 15, 2014

(54) SYSTEM AND METHOD FOR MANAGING MULTIPLE TRANSPORTATION OPERATIONS

(75) Inventors: Murali Ande, Flower Mound, TX (US); Tuell C. Green, Euless, TX (US); James T. Diamond, Grapevine, TX (US); Kunal Shah, Irving, TX (US)

(73) Assignee: American Airlines, Inc., Fort Worth, TX (US)

( * ) Notice: Subject to any disclaimer, the term of this patent is extended or adjusted under 35 U.S.C. 154(b) by 647 days.

This patent is subject to a terminal disclaimer.

(21) Appl. No.: 12/686,083

(22) Filed: Jan. 12, 2010

Related U.S. Application Data

(63) Continuation-in-part of application No. 12/350,160, filed on Jan. 7, 2009, which is a continuation-in-part of application No. 12/183,645, filed on Jul. 31, 2008.

(51) Int. Cl.
*G06Q 10/00* (2012.01)
*G06Q 50/00* (2012.01)

(52) U.S. Cl.
USPC ............... 705/7.22; 705/5; 705/7.12

(58) Field of Classification Search
USPC ..................... 705/5, 6, 7.12, 7.22
See application file for complete search history.

(56) References Cited

U.S. PATENT DOCUMENTS

| | | | |
|---|---|---|---|
| 6,161,097 A * | 12/2000 | Glass et al. ............ | 705/6 |
| 6,314,361 B1 * | 11/2001 | Yu et al. ............ | 701/120 |
| 6,721,714 B1 * | 4/2004 | Baiada et al. ............ | 705/7.13 |
| 2002/0177943 A1 * | 11/2002 | Beardsworth ............ | 701/120 |
| 2003/0050746 A1 * | 3/2003 | Baiada et al. ............ | 701/3 |
| 2003/0139875 A1 * | 7/2003 | Baiada et al. ............ | 701/120 |
| 2003/0167109 A1 * | 9/2003 | Clarke et al. ............ | 701/3 |
| 2003/0225598 A1 * | 12/2003 | Yu et al. ............ | 705/5 |
| 2004/0054550 A1 * | 3/2004 | Cole et al. ............ | 705/1 |
| 2005/0216281 A1 * | 9/2005 | Prior ............ | 705/1 |
| 2005/0246224 A1 | 11/2005 | McKanna et al. | |
| 2007/0219833 A1 * | 9/2007 | Trautman ............ | 705/5 |
| 2009/0125357 A1 * | 5/2009 | Vannette et al. ............ | 705/8 |

FOREIGN PATENT DOCUMENTS

WO WO 2008061793 A1 * 5/2008

OTHER PUBLICATIONS

Eriksen, Collaborative Decision Making Information Management in Airports, 2002, IEEE 0-7803-7367-7/02.*
Fuhr, Robust Flight Scheduling—An Analytic Approach to Performance Evaluation and Optimization, Apr. 23, 2007.*
Schaefer, et al., Improving Airlines Operational Performance through Schedule Perturbation, Oct. 28, 2002.*
Arguello, et al., A GRASP for Aircraft Routing in Response to Groundings and Delays, 1997, J. of Combinatorial Optimization 5, 211-228.*
U.S. Appl. No. 12/183,645, filed Jul. 31, 2008, Niznik et al.
U.S. Appl. No. 12/349,926, filed Jan. 7, 2009, Tansupaswatdikul et al.
U.S. Appl. No. 12/350,160, filed Jan. 7, 2009, Ande et al.
U.S. Appl. No. 12/350,178, filed Jan. 7, 2009, Osborne et al.

(Continued)

*Primary Examiner* — Daniel Vetter
(74) *Attorney, Agent, or Firm* — Haynes and Boone, LLP

(57) ABSTRACT

A system and method for managing multiple transportation operations according to which one or more vehicles such as, for example, airplanes, arrive at, and depart from, one or more specific locations such as, for example, airports.

17 Claims, 12 Drawing Sheets

(56) References Cited

OTHER PUBLICATIONS

U.S. Appl. No. 12/683,984, filed Jan. 7, 2010, Green et al.

U.S. Appl. No. 61/143,075, filed Jan. 7, 2009, Green et al.

Jeff Bailey, "Airline Work on Systems to Reduce Delays" The New York Times, Nov. 15, 2007, 4 pages, nytimes.com, N.Y., USA.

* cited by examiner

| Station: | DFW ▶ | Fit Range: | All ▶ | | Search in: | Flight ▶ | | Go | Save | My Settings | Hide | Get Data |
|---|---|---|---|---|---|---|---|---|---|---|---|---|

Departing Flights

| Flight | Dest | SchDep | LatDep | TgT | PrjDep | DepDly | SchArv | LatArv | PrjArv | SchBlk | BlkDif | MisCnx | HoldCn | HoldAC | DepGat | ArvGat | CI | DnlDest | DnlTurn | Slack |
|---|---|---|---|---|---|---|---|---|---|---|---|---|---|---|---|---|---|---|---|
| 3893 | ABI | 1625 | 1625 | 1625 | 1641 | 16 | 1715 | 1721 | 1731 | 50 | 6 | 0 | 0 | -16 | B24 | | 0 | DFW | 30 | 0 |
| 1848 | BNA | 1625 | 1625 | 1625 | 1625 | 0 | 1810 | 1803 | 1803 | 105 | -7 | 3 | 8 | 7 | C20 | C3 | 15 | DFW | 40 | 22 |
| 1699 | DEN | 1625 | 1627 | 1627 | 1634 | 9 | 1730 | 1734 | 1737 | 125 | 2 | 0 | 0 | -7 | C24 | C39 | 123 | DFW | 40 | 4 |
| 3623 | HOU | 1620 | 1629 | 1629 | 1634 | 14 | 1730 | 1732 | 1744 | 70 | -7 | 0 | 0 | | B19 | 28 | 0 | DFW | 30 | 6 |
| 3353 | AMA | 1630 | 1630 | 1630 | 1630 | 0 | 1740 | 1755 | 1755 | 70 | 15 | 4 | 4 | -14 | B15 | 32 | 0 | DFW | 30 | 0 |
| 3425 | CLL | 1630 | 1630 | 1630 | 1630 | 0 | 1725 | 1718 | 1725 | 55 | -7 | 2 | 4 | -15 | B21 | | 0 | DFW | 30 | 0 |
| 1827 | SMF | 1630 | 1630 | 1634 | 1630 | 0 | 1820 | 1812 | 1812 | 230 | -8 | 2 | 1 | 0 | C26 | 35 | 15 | DFW | 40 | Term |
| 1141 | STL | 1550 | 1630 | 1630 | 1630 | 40 | 1725 | 1808 | 1808 | 95 | 3 | 0 | 0 | 8 | A10 | C10 | 159 | MCO | 40 | 0 |
| 1803 | LAS | 1630 | 1630 | 1634 | 1630 | 0 | 1735 | 1727 | 1727 | 185 | -8 | 6 | 21 | -43 | A39 | D8 | 15 | DFW | 40 | 18 |
| 3695 | FSM | 1630 | 1630 | 1630 | 1630 | 0 | 1730 | 1731 | 1731 | 60 | -1 | 0 | 0 | 8 | B8 | 2 | 0 | DFW | 25 | 0 |
| 0738 | LGA | 1505 | 1630 | 1633 | 1630 | 85 | 1935 | 2054 | 2054 | 210 | -6 | 0 | 0 | -1 | C11 | D10 | 15 | ORD | 55 | 34 |
| 5175 | MAF | 1625 | 1633 | 1633 | 1658 | 33 | 1800 | 1813 | 1833 | 95 | 5 | 0 | 0 | -79 | B36B | | 0 | DFW | 30 | 0 |
| 0878 | EWR | 1635 | 1635 | 1644 | 1635 | 0 | 2100 | 2042 | 2042 | 205 | -18 | 0 | 0 | -33 | A34 | 34 | 15 | DFW | 40 | Term |
| 3771 | VPS | 1545 | 1635 | 1635 | 1635 | 50 | 1735 | 1814 | 1825 | 110 | -11 | 0 | 0 | 18 | B10B | | 0 | DFW | 30 | 0 |
| 0422 | RDU | 1635 | 1635 | 1641 | 1635 | 0 | 2005 | 1952 | 1952 | 150 | -13 | 0 | 0 | -50 | A16 | C17 | 15 | DFW | 40 | Term |

Fig. 6

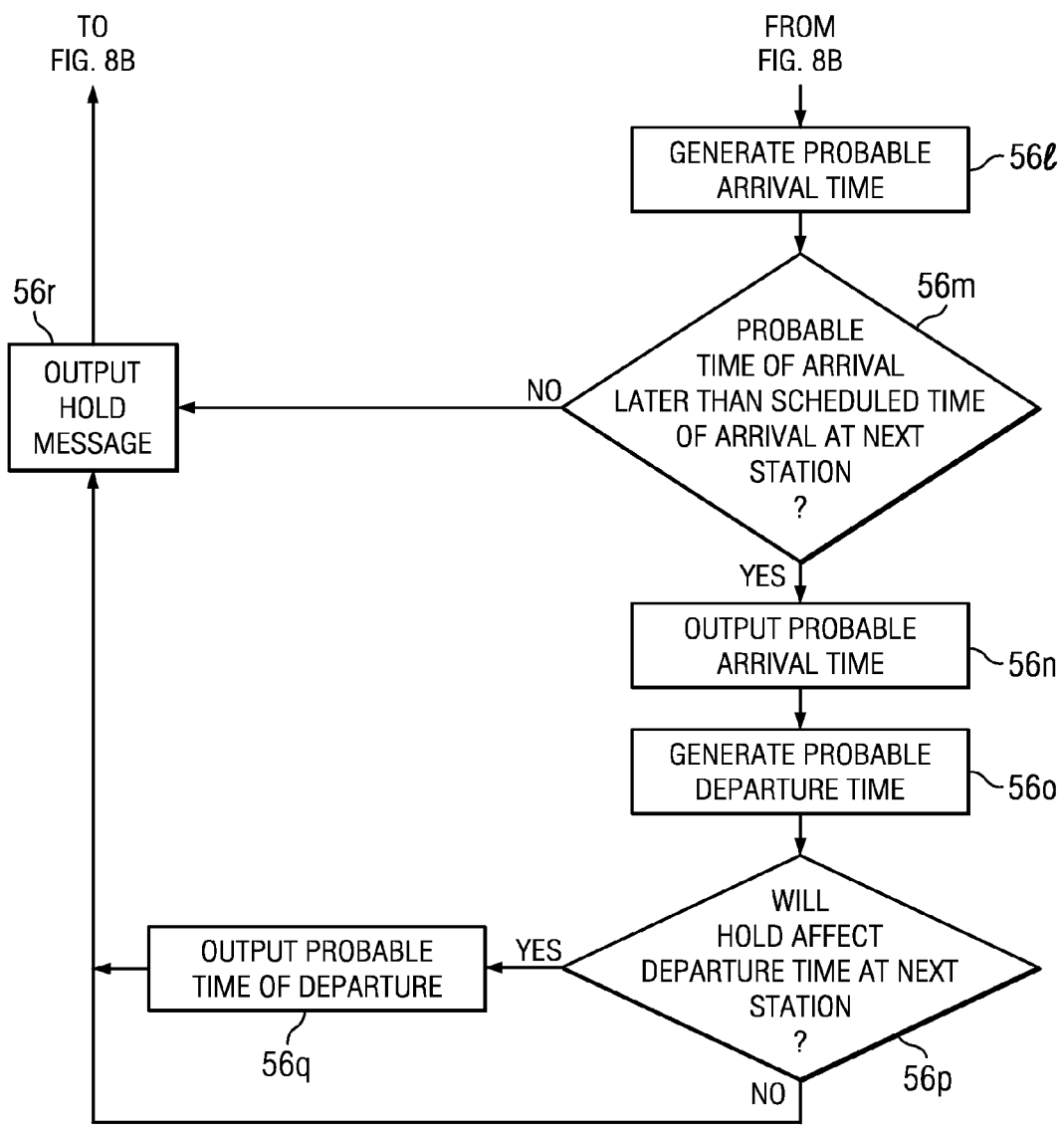
Fig. 8C
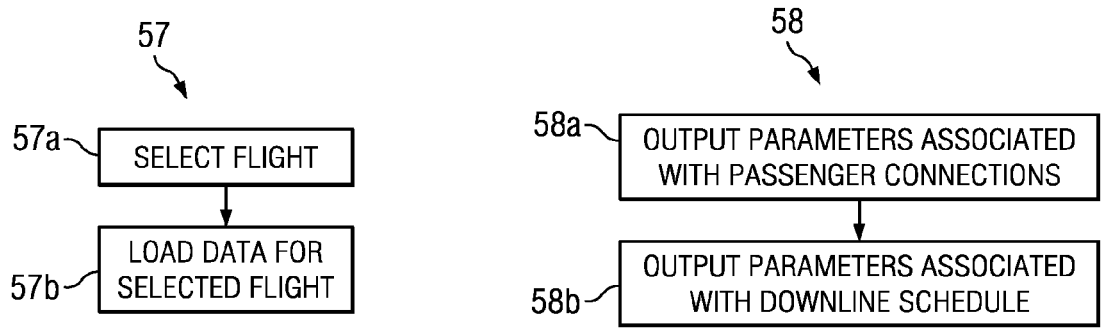
Fig. 9A
Fig. 9B

Passenger Conx Detail | Downline Detail

Incoming Connections To 1827

| Pax | Bags | Hold Time | Arrv Flight | From | Arrv Gate | Proj Arv |
|-----|------|-----------|-------------|------|-----------|----------|
| 2   | 2    | -1        | 0434        | ELP  | A18       | 1613     |
| 2   | 2    | -18       | 1699        | ATL  | C24       | 1602     |
| 6   | 6    | -21       | 2461        | RIC  | A11       | 1551     |
| 1   | 1    | -23       | 5160        | LBB  | B38       | 1542     |
| 1   | 1    | -30       | 0677        | IAH  | C7        | 1545     |

76a, 76b, 76c

Next Flight To SMF — 76d

| Flight | SchDep | LatDep | PrjDep | Wait Time | Avail Seats |
|--------|--------|--------|--------|-----------|-------------|
| 1951   | 2015   | 2015   | 2015   | 225       | 12          |

Fig. 11B — 78

Passenger Conx Detail | Downline Detail

Delay Sequence For 1685 — 78a

| Flight | Origin | Dest | SchDep | LatDep | PrjDep | Dly | TotalDl | Count | Fix |
|--------|--------|------|--------|--------|--------|-----|---------|-------|-----|
| 1685   | DFW    | ELP  | 1620   | 1645   | 1647   | 0   | 2       | 1     | N   |
| 0885   | ELP    | DFW  | 1750   | 1750   | 1752   | 2   | 0       | 0     | N   |

Arriving Aircraft — 78b

| Type | Tail | Flight | Origin | PrjArv |
|------|------|--------|--------|--------|
| SP80 | 540  | 0434   | ELP    | 1611   |
| SP80 | 540  | 1685   | DFW    | 1726   |

Cockpit Crew — 78c

| Flight | Origin | PrjArv |
|--------|--------|--------|
| ORIG   |        |        |
| 1685   | DFW    | 1726   |

Cabin Crew — 78d

| Flight | Origin | PrjArv |
|--------|--------|--------|
| ORIG   |        |        |
| 1685   | DFW    | 1726   |

SYSTEM AND METHOD FOR MANAGING MULTIPLE TRANSPORTATION OPERATIONS

CROSS REFERENCE TO RELATED APPLICATIONS

This application is a continuation-in-part of U.S. patent application Ser. No. 12/350,160, filed on Jan. 7, 2009, which is a continuation-in-part of U.S. patent application Ser. No. 12/183,645, filed on Jul. 31, 2008, the disclosures of which are incorporated herein by reference.

This application is related to (1) U.S. patent application Ser. No. 12/183,645, filed on Jul. 31, 2008; (2) U.S. patent application Ser. No. 12/349,926, filed on Jan. 7, 2009; (3) U.S. patent application Ser. No. 12/350,178, filed on Jan. 7, 2009; (4) U.S. patent application Ser. No. 12/350,160, filed on Jan. 7, 2009; (5) U.S. patent application No. 61/143,075, filed on Jan. 7, 2009; and (6) U.S. patent application Ser. No. 12/683,984, filed on Jan. 7, 2010, the disclosures of which are incorporated herein by reference.

BACKGROUND

The present disclosure relates in general to a system and method for managing multiple transportation operations such as, for example, air, land and/or sea transportation operations, and in particular to a system and method for managing operations during which one or more vehicles arrive at, and depart from, one or more specific locations, such as, for example, operations during which multiple airplanes arrive at, and depart from, multiple airport gates at multiple airports.

BRIEF DESCRIPTION OF THE DRAWINGS

FIG. 6 is a diagrammatic illustration of output generated during the step of FIG. 5B, according to an exemplary embodiment.

FIGS. 8A, 8B and 8C together form a flow chart illustration of the steps of providing one or more functional indicators and outputting one or more hold messages of the method of FIG. 4, according to another exemplary embodiment.

FIG. 9A is a flow chart illustration of the step of receiving flight data of the method of FIG. 4, according to an exemplary embodiment.

FIG. 9B is a flow chart illustration of the step of outputting one or more parameters in response to receiving flight data of the method of FIG. 4, according to an exemplary embodiment.

FIG. 10 is a diagrammatic illustration of output generated during the step of FIG. 9B, according to an exemplary embodiment.

FIG. 11A is another diagrammatic illustration of output generated during the step of FIG. 9B, according to an exemplary embodiment.

FIG. 11B is another diagrammatic illustration of output generated during the step of FIG. 9B, according to an exemplary embodiment.

DETAILED DESCRIPTION

Figure 1:
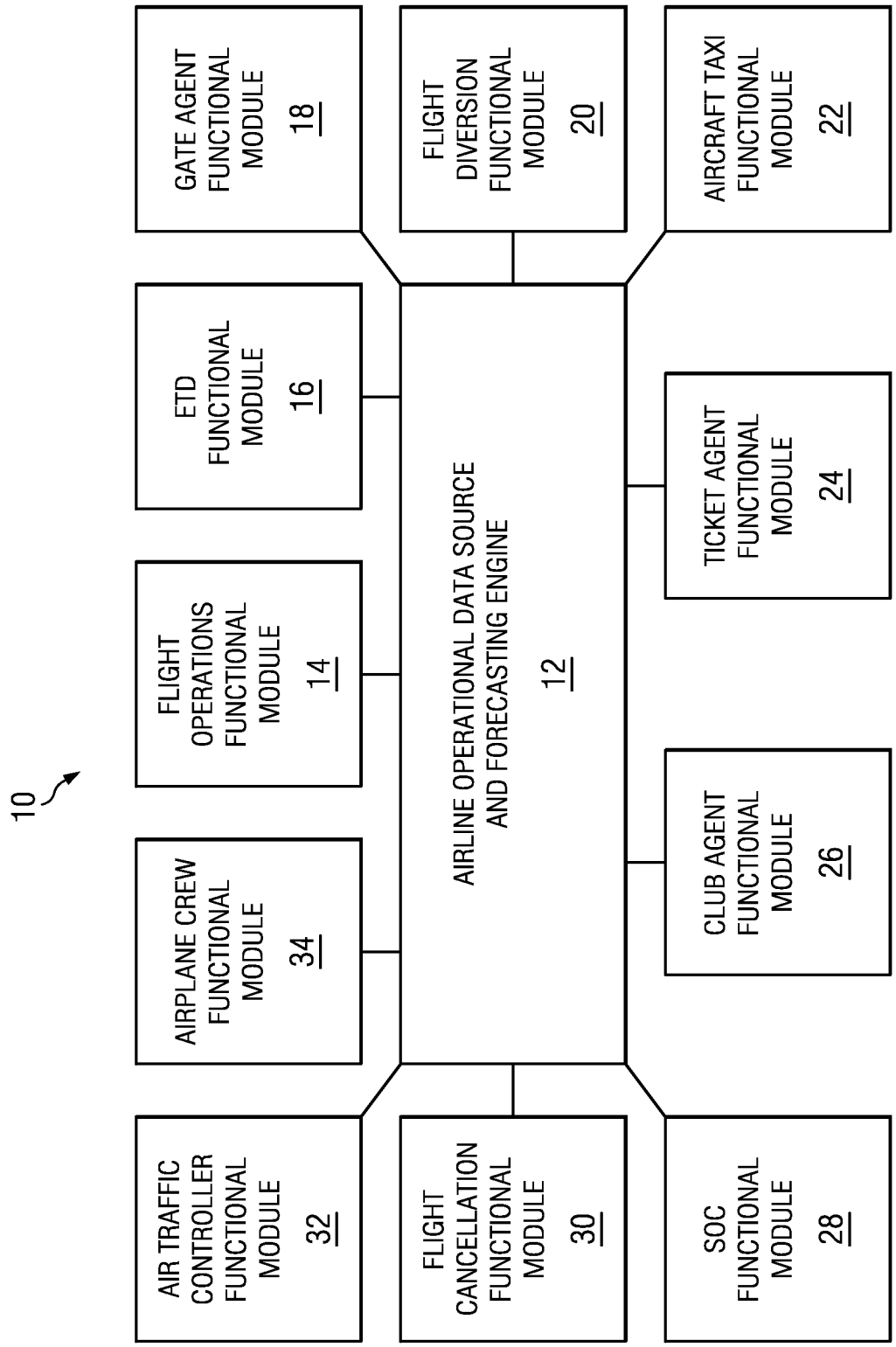
FIG. 1 is a diagrammatic illustration of a system according to an exemplary embodiment, the system including an airline operational data source and forecasting engine, and functional modules operably coupled to the engine, the functional modules including a flight operations functional module, according to respective exemplary embodiments.

In an exemplary embodiment, as illustrated in FIG. 1, a system is generally referred to by the reference numeral 10 and includes an airline operational data source and forecasting engine 12. Functional modules are operably coupled to, and in communication with, the engine 12, namely a flight operations functional module 14, an Estimated Time of Departure (ETD) functional module 16, a gate agent functional module 18, a flight diversion functional module 20, an aircraft taxi functional module 22, a ticket agent functional module 24, a club agent functional module 26, a system operations control (SOC) functional module 28, a flight cancellation functional module 30, an air traffic controller functional module 32, and an airplane crew functional module 34.

In several exemplary embodiments, one or more of the functional modules 14, 16, 18, 20, 22, 24, 26, 28, 30, 32 and 34 are in two-way communication with the engine 12. In several exemplary embodiments, one or more of the functional modules 14, 16, 18, 20, 22, 24, 26, 28, 30, 32 and 34 are in one-way communication with the engine 12. In several exemplary embodiments, one or more of the functional modules 14, 16, 18, 20, 22, 24, 26, 28, 30, 32 and 34 are in wireless communication with the engine 12. In several exemplary embodiments, one or more of the functional modules 14, 16, 18, 20, 22, 24, 26, 28, 30, 32 and 34 are operably coupled to, and in communication with, the engine 12 via a network, such as, for example, the Internet, any type of local area network, any type of wide area network, any type of wireless network, any type of voice network, any type of data network, and/or any combination thereof.

In several exemplary embodiments, one or more of the engine 12 and the functional modules 14, 16, 18, 20, 22, 24, 26, 28, 30, 32 and 34 include a computer readable medium or memory having a plurality of instructions stored therein, which instructions are accessible to, and executable by, a processor. In several exemplary embodiments, one or more of the engine 12 and the functional modules 14, 16, 18, 20, 22, 24, 26, 28, 30, 32 and 34 include one or more data structures or databases, which databases are accessible to a processor. In several exemplary embodiments, one or more of the engine 12 and the functional modules 14, 16, 18, 20, 22, 24, 26, 28, 30, 32 and 34 include a processor, a computer readable medium or memory operably coupled to the processor, a plurality of instructions stored in the computer readable medium and accessible to, and executable by, the processor, and one or more data structures or databases stored in the computer readable medium and accessible to the processor.

In an exemplary embodiment, the engine 12 provides data collection and management functionality. The engine 12 collects and stores real-time data from multiple sources and provides integrated data forecasts to the functional modules 14, 16, 18, 20, 22, 24, 26, 28, 30, 32 and 34. In an exemplary embodiment, the data collected by the engine 12 includes latest published flight times and status, latest gate assignments, aircraft rotations, crew sequence information, passenger counts and connections, baggage counts and connections, crew legality information, curfew information, and slot restrictions. Additionally, the engine 12 is capable of generating forecasts of downline impacts as a result of existing delays throughout the system.

In an exemplary embodiment, the engine 12 issues a query for all flight data. In one embodiment, a flight operating system may respond to the query with flight data and crew data in raw form covering the time period 144 hours after the time of the query was made. The flight data includes:

flight number: an identifier for the flight,
destination: the destination for the current flight,
scheduled departure: the time that the aircraft is scheduled to pull back from the gate,
published departure time: the published time that the aircraft is scheduled to pull back from the gate,
target departure: the time that the aircraft is targeted to pull back from the gate (associated with the variable departure calculations associated with the functional module 14),
projected departure: a forecasted departure time based on the propagation forecast,
departure delay: the time that the departure has been delayed,
scheduled arrival: the time that the aircraft is scheduled to pull up to a gate,
published arrival time: the published time that the aircraft is scheduled to pull up to a gate.
projected arrival: a forecasted arrival time based on the propagation forecast,
scheduled block time: number of minutes that reflects the difference between scheduled arrival time and scheduled departure time,
block difference: the difference between the scheduled block time and the flight plan,
missed connections: the number of customers that might miss a connection,
hold connections: the number of minutes a flight needs to be delayed to allow at least one of the missed connection passengers to make a connecting flight,
hold arrive on-time: the number of minutes a flight could be delayed and still arrive on time,
departure gate: the gate from which the aircraft is departing.
arrival gate: the gate at which the aircraft is arriving,
cost index: a numerical value associated with the cost of fuel based on the speed of flying,
downline destination: the destination of the next flight for the aircraft,
downline turn: time that the aircraft is scheduled on the ground at the downline station before the next flight of the aircraft, and
slack: minutes above the planned minimum time of ground time at the down-line station before the next flight of the aircraft.

In an exemplary embodiment, the engine 12 also obtains or accesses passenger data. The passenger data is obtained every four hours and contains real-time booking information covering a 72 hour period. In another embodiment, the passenger data is requested or obtained each time a change occurs on a flight if the flight's load factor exceeds a predetermined threshold. In an exemplary embodiment, the passenger data includes names, club member identification numbers, passenger number record, connecting flight information, and bag information. Further, the engine 12 may obtain ADL files from a governmental organization (e.g., the Federal Aviation Administration), cargo information (such as unit, weight, connection information, and priority), and maintenance information for each aircraft.

In an exemplary embodiment, the flight operations functional module 14 is an integrated station view of flight operations data. The flight operations functional module 14 provides operational information and decision support to tower and operations personnel. The operational information includes departure holds to reduce misconnects, early departures, ETD posting, and gate conflicts. A user device displays flight information (including departure and arrival times and flight plans), gate information, potential misconnecting passengers, same day protection options for misconnecting passengers, and incoming connecting passenger information. The module 14 may perform analysis of the integrated data provided to the engine 12 to recommend holding departures or indicate that departures can be held.

In an exemplary embodiment, the ETD functional module 16 automatically posts estimated times of departures (ETDs) based on delayed inbound resources (such as aircraft and/or crew). In an exemplary embodiment, the ETD functional module 16 enables each gate at an airport to have its own posting rules. In an exemplary embodiment, the ETD functional module 16 has a user device that displays gates at airports, allows the creation of groups of gates to allow posting rules to a pre-defined subset of gates, and enables the setting of ETD posting criteria and thresholds.

In an exemplary embodiment, the gate agent functional module 18 provides gate agents with operational information for a specific flight. In an exemplary embodiment, the gate agent functional module 18 has a user device that displays flight information (including ETD, gate information, flight, and inbound aircraft information, information about inbound connections, downline connections, and inbound crew and aircraft) and information about alternative flights traveling to the destination to which a passenger is headed but unable to make the originally ticketed connecting flight. In several exemplary embodiments, the crew functional module 34 includes one or more features, aspects, components, and/or systems disclosed in U.S. patent application Ser. No. 12/350, 160, filed on Jan. 7, 2009, the disclosure of which is incorporated herein by reference.

In an exemplary embodiment, the aircraft taxi functional module 22 monitors flights system-wide for taxi times that exceed a desired time threshold and provides a user device that is user-customizable to enable tracking and monitoring of taxi tames. In an exemplary embodiment, the aircraft taxi functional module 22 also generates text message alerts to designated personnel that one or more flights have exceeded certain thresholds for taxi-in or taxi-out. In an exemplary embodiment, the desired time threshold is three hours.

In an exemplary embodiment, the ticket agent functional module 24 provides information to ticket count agents about flights that are experiencing some type of disruption (such as delays, mechanical problems, or crew problems). In an exemplary embodiment, the ticket agent functional module 24 alerts ticket counter agents about possible flight disruptions when processing passengers associated with flights that may have disruptions. In an exemplary embodiment, the ticket agent functional module 24 captures check-in data for passengers and alerts the agent if a flight disruption is expected for that passenger's flight.

In an exemplary embodiment, the club agent functional module 26 provides specialty agents with flight information for designated passengers. In exemplary embodiment, when a designated passenger visits a designated guest area, the designated passenger checks in with the specialty agent. The specialty agent interfaces with the club agent functional module 26 and inputs the designated passenger's passenger information. The club agent functional module 26 tracks and monitors the flights associated with the designated passengers that are within the designated guest area and can provide alerts if flights associated with the designated passengers are disrupted.

In an exemplary embodiment, the SOC functional module 28 alerts system operations control (SOC) about potential flight delays due to late arriving resources (such as crew or aircraft). In an exemplary embodiment, the SOC functional module 28 provides a view of flight operations, projected departure times, passenger connections, and air traffic control data. In an exemplary embodiment, the SOC functional module 28 provides recommended actions to mitigate delays that are detected in the system. In an exemplary embodiment, the SOC functional module 28 has a user device that displays information about inbound crews, inbound flights, aircraft, and outbound flights, and that receives inputs from a user about the crews, flights, and aircraft.

In an exemplary embodiment, the flight cancellation functional module 30 provides functionality to assist the SOC in determining the flights to cancel during off schedule operations. The flight cancellation functional module 30 analyzes operational constraints while minimizing the disruption to passengers, crews, and aircraft maintenance. In an exemplary embodiment, the flight cancellation functional module 30 has a user device that displays information about a planned cancellation, including information about crews disrupted, the number of passengers disrupted, the number of passengers disrupted with an alternative connection, information about markets affected by the disruptions, and information about gates affected by the disruptions.

In an exemplary embodiment, the air traffic controller functional module 32 manages slots for air traffic control delay programs. The air traffic controller functional module 32 analyzes and projects delays to detect crew curfew and potential passenger disruption problems. The air traffic controller functional module 32 also redistributes delays to minimize the impact on operations and passengers. In an exemplary embodiment, the air traffic controller functional module 32 has a user device that displays a summary of the impact that slot management will have on passengers and crew, inbound flight and slot details, outbound flight details, and that receives inputs from a user about modifying air traffic control slots.

In an exemplary embodiment, the airplane crew functional module 34 automates the repair of broken crew pairings and minimizes uncovered flights and standby reserve crews while observing governmental and contractual work rules. In an exemplary embodiment, the crew functional module 34 has a user device that displays the crew members included in a recovery package, the original sequence of a crew member, and the new sequence for the crew member. In several exemplary embodiments, the crew functional module 34 includes one or more features, aspects, components, and/or systems disclosed in U.S. patent application Ser. No. 11/726,946, filed on Mar. 23, 2007, the disclosure of which is incorporated herein by reference.

The engine 12 is capable of producing three types of forecasting: (i) projected times, (ii) probable times, and (iii) postable times. Projected times are forecasted times based on resource dependencies and take into account that no actions will be taken to reduce or adjust delays. One of the uses of the projected times forecast is the ability to detect potential problems early (such as legality and curfew issues). Probable times are based on the projected times and take into account that actions will be taken to reduce or adjust delays. One of the uses of the probable times is pre-planning and prioritization. Postable times are based on probable times and take into account variability in the forecast. One of the uses of the postable times is to publish estimated times of departures to passengers.

Figure 2:
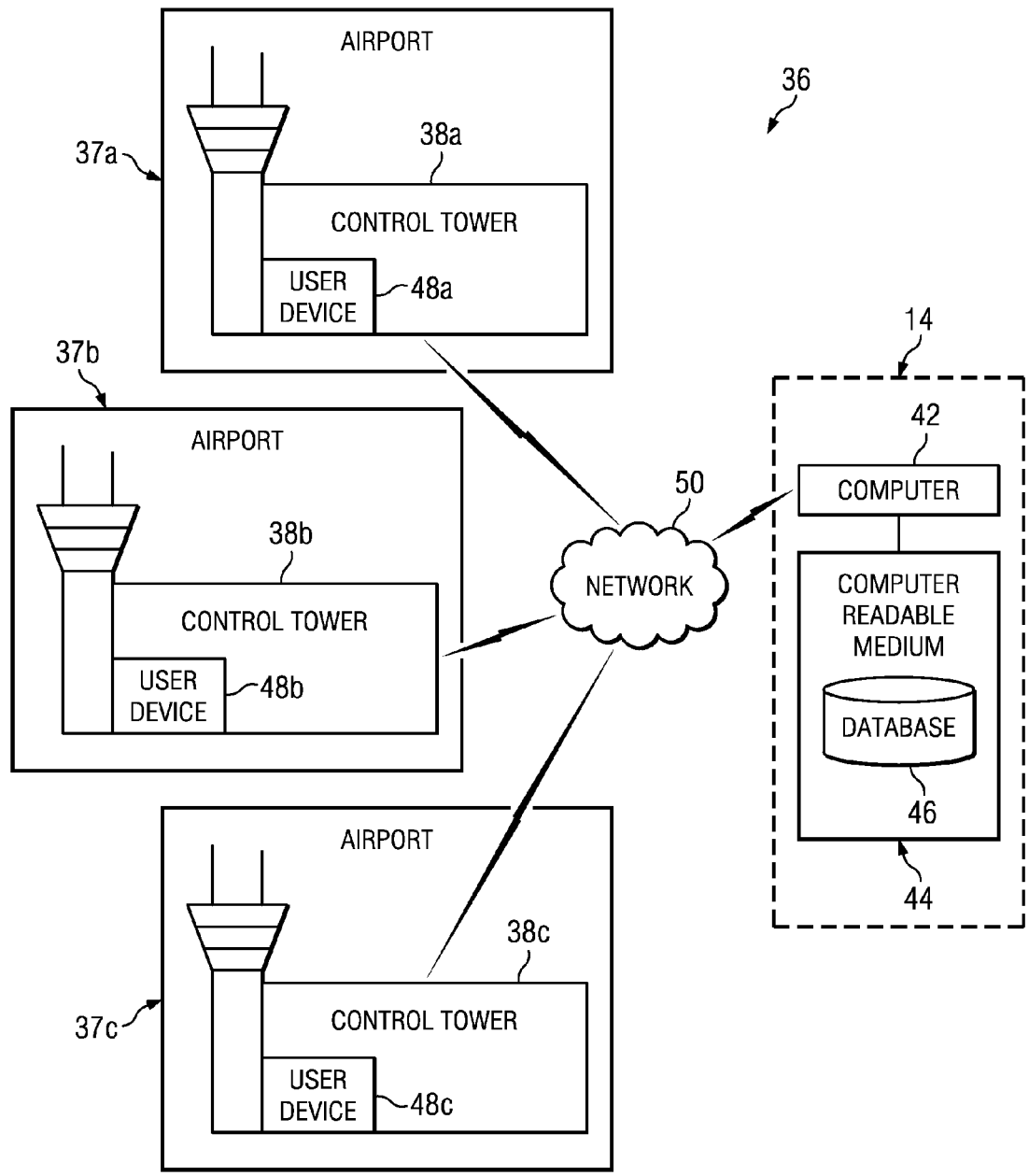
FIG. 2 is a diagrammatic illustration of a system according to an exemplary embodiment, the system including the flight operations functional module of FIG. 1, a plurality of control towers, and a plurality of remote user devices, according to respective exemplary embodiments.

In an exemplary embodiment, as illustrated in FIG. 2 with continuing reference to FIG. 1, a system is generally referred to by the reference numeral 36 and includes control towers 38*a*, 38*b* and 38*c*, which are configured to manage the arrival and departure of vehicles such as, for example, airplanes, to and from stations or airports 37*a*, 37*b* and 37*c*, respectively. The control towers 38*a*, 38*b* and 38*c* are part of the stations or airports 37*a*, 37*b* and 37*c*, respectively, at which airplanes arrive and from which airplanes depart. The system 36 further includes the flight operations functional module 14 of the system 10, the module 14 including a computer 42 and a computer readable medium 44 operably coupled thereto. Instructions accessible to, and executable by, the computer 42 are stored in the computer readable medium 44. A database 46 is also stored in the computer readable medium 44. Remote user devices 48*a*, 48*b* and 48*c* are located at the control towers 38*a*, 38*b* and 38*c*, respectively, and are operably coupled to, and in two-way communication with, the computer 42 of the module 14 via a network 50.

In an exemplary embodiment, the module 14 is part of the engine 12. In an exemplary embodiment, one or more components of the module 14, including the computer 42, the computer readable medium 44, content stored in the computer readable medium 44, the database 46, content stored in the database 46, and/or any combination thereof, are part of the engine 12. In an exemplary embodiment, the module 14 and/or one or more components thereof are part of, and/or are distributed throughout, the system 10 and/or one or more of the components thereof, including one or more of the engine 12, and the modules 16, 18, 20, 22, 24, 26, 28, 30, 32 and 34. In an exemplary embodiment, the computer readable medium 44 and/or content stored therein are part of, and/or are distributed throughout, the system 10 and/or one or more of the components thereof, including one or more of the engine 12, and the modules 16, 18, 20, 22, 24, 26, 28, 30, 32 and 34. In an exemplary embodiment, the database 46 and/or the contents stored therein are part of, and/or are distributed throughout, the system 10 and/or one or more of the components thereof, including one or more of the engine 12, and the modules 16, 18, 20, 22, 24, 26, 28, 30, 32 and 34.

In an exemplary embodiment, the module 14 is, includes, or is at least a part of, a web-based program, an Intranet-based program, and/or any combination thereof.

In an exemplary embodiment, the module 14 and/or one or more components thereof are part of, and/or are distributed throughout, the system 36 and/or one or more of the components thereof, including one or more of the user devices 48a, 48b and 48c. In an exemplary embodiment, the computer readable medium 44 and/or content stored therein are part of, and/or are distributed throughout, the system 36 and/or one or more of the components thereof, including one or more of the user devices 48a, 48b and 48c. In an exemplary embodiment, the database 46 and/or content stored therein are part of, and/or are distributed throughout, the system 36 and/or one or more of the components thereof, including one or more of the user devices 48a, 48b and 48c. In an exemplary embodiment, the network 50 includes the Internet, one or more local area networks, one or more wide area networks, one or more wireless networks, one or more voice networks, one or more data networks, and/or any combination thereof.

In several exemplary embodiments, the respective quantities of one or more of the components and/or parts of the system 36, such as, for example, the respective quantities of the module 14, the computer 42, the computer readable medium 44, the database 46, the user devices 48, and the control towers 38 are increased, decreased or otherwise varied.

Figure 3:
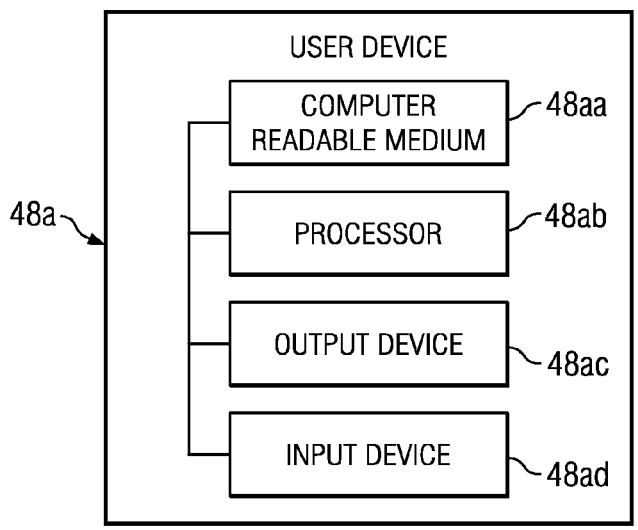
FIG. 3 is a diagrammatic illustration of one of the remote user devices of FIG. 2, according to an exemplary embodiment.

In an exemplary embodiment, as illustrated in FIG. 3 with continuing reference to FIGS. 1 and 2, the user device 48a includes a computer readable medium 48aa, a processor 48ab, an output device 48ac, and an input device 48ad. In an exemplary embodiment, instructions accessible to, and executable by, the processor 48ab are stored in the computer readable medium 48aa. In an exemplary embodiment, web browser software is stored in the computer readable medium 48aa. In an exemplary embodiment, the output device 48ac includes a graphical display, which, in several exemplary embodiments, is in the form of, or includes, one or more digital displays, one or more liquid crystal displays, one or more cathode ray tube monitors, and/or any combination thereof. In an exemplary embodiment, the output device 48ac includes a graphical display, a printer, a plotter, and/or any combination thereof. In an exemplary embodiment, the input device 48ad includes a touch screen, which, in several exemplary embodiments, is, includes, or is at least a part of, the output device 48ac. In an exemplary embodiment, instead of, or in addition to a touch screen, the input device 48ad includes one or more keyboards, one or more pin pads, one or more scanners, one or more card readers, and/or any combination thereof.

As noted above, in an exemplary embodiment, the user device 48a is located at the control tower 38a. In an exemplary embodiment, the user device 48a is located at an airline traffic operator's workstation within the control tower 38a. In an exemplary embodiment, the user device 48a is a computing terminal located at the workstation of the airline traffic operator within the control tower 38a. In an exemplary embodiment, the user device 48a is a handheld or otherwise portable computing device which is carried by one or more airline traffic operators. In an exemplary embodiment, the user device 48a is, includes, or is at least a part of, the module 14, the computer 42, the computer readable medium 44, the database 46, and/or any combination thereof. In several exemplary embodiments, the user device 48a is a thin client and the computer 42 controls at least a portion of the operation of the user device 48a. In several exemplary embodiments, the user device 48a is a thick client. In several exemplary embodiments, the user device 48a functions as both a thin client and a thick client. In several exemplary embodiments, the user device 48a is, or includes, a telephone, a personal computer, a personal digital assistant, a cellular telephone, other types of telecommunications devices, other types of computing devices, and/or any combination thereof. In several exemplary embodiments, the user device 48a includes a plurality of user devices. In several exemplary embodiments, the user device 48a is, or at least includes, the module 14. In several exemplary embodiments, the user device 48a is, or at least includes, one or more of the computer 42, the computer readable medium 44, the database 46, one or more of the user devices 48b and 48c, and/or any combination thereof.

In an exemplary embodiment, each of the user devices 48b and 48c is substantially identical to the user device 48a and therefore will not be described in detail. In several exemplary embodiments, the platforms of the computer 14 and the user devices 48a, 48b and 48c are identical. In several exemplary embodiments, the platforms of the computer 14 and the user devices 48a, 48b and 48c are different. In several exemplary embodiments, the platforms of the computer 42 and the user devices 48a, 48b and 48c vary with respect to equipment, peripherals, hardware architecture and/or specifications, software architecture and/or specifications, and/or any combination thereof.

Figure 4:
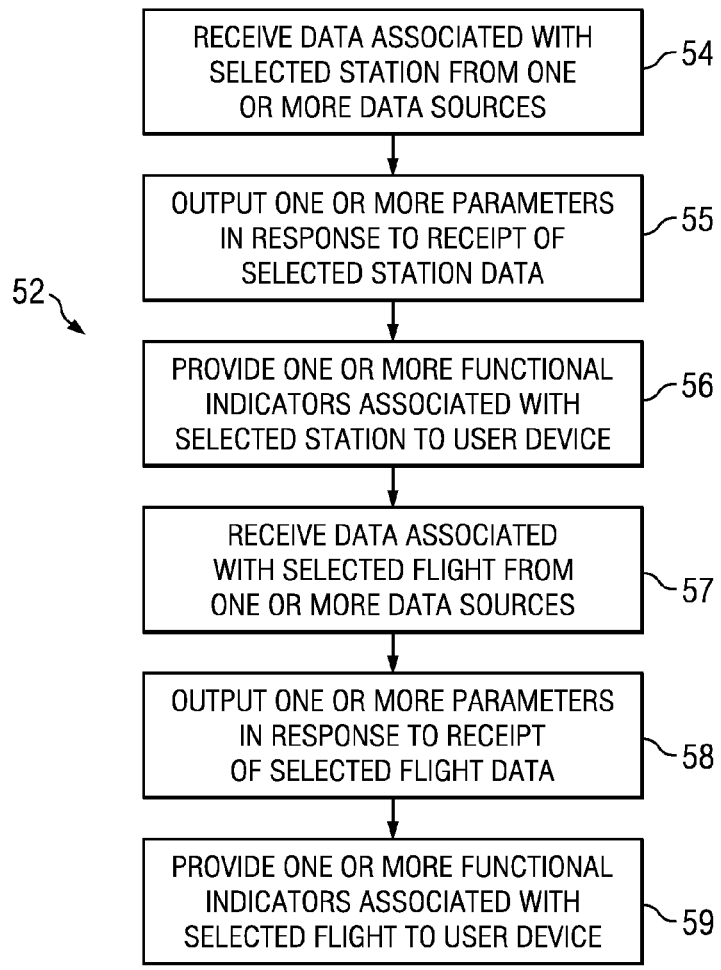
FIG. 4 is a flow chart illustration of a method of operating the system of FIG. 2, according to an exemplary embodiment, the method including receiving station data, outputting one or more parameters in response to receiving station data, providing one or more functional indicators associated with a station, receiving flight data, outputting one or more parameters in response to receiving flight data, providing one or more functional indicators associated with a flight and outputting one or more hold messages, according to respective exemplary embodiments.

In an exemplary embodiment, as illustrated in FIG. 4 with continuing reference to FIGS. 1-3, a method of operating the system 36 is generally referred to by the reference numeral 52 and, in several exemplary embodiments, the method 52 is implemented by, or at least partially implemented by, the module 14 of the system 10, the engine 12 of the system 10, the user devices 48a, 48b and 48c, and/or any combination thereof. For the purpose of clarity, the method 52 will be described with respect to the control tower 38a and the airport 37a. The execution of the method 52 with respect to either the control tower 38b and the airport 37b, or the control tower 38c and the airport 38c, is substantially similar to the execution of the method 52 with respect to the control tower 38a and the airport 37a.

As shown in FIG. 4, the method 52 includes receiving data associated with a selected station and a selected flight, from one or more data sources in step 54, outputting parameters in response to the receipt of this station data in step 55, providing one or more functional indicators to the user device 48a or other user devices in step 56, receiving data associated with one or more or the airline flights from a station, from one or more data sources in step 57, outputting parameters in response to the receipt of this flight data in step 58, and providing one or more functional indicators to the user device 48a or other user devices in step 59.

Figure 5A:
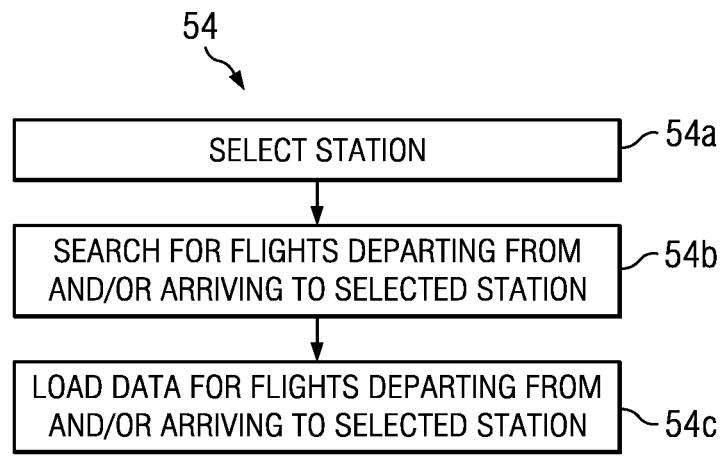
FIG. 5A is a flow chart illustration of the step of receiving station data of the method of FIG. 4, according to an exemplary embodiment.

In an exemplary embodiment, as illustrated in FIG. 5A with continuing reference to FIGS. 1-4, the step 54 includes selecting or otherwise inputting the airport 37a at which the control tower 38a is located, the airport selected in the step 54a being hereinafter referred to as "the selected station," searching for flights that will depart from and/or arrive at the selected station in step 54b, and loading data for flights that will depart from and/or arrive at the selected station in step 54c.

In an exemplary embodiment, to execute the step 54 and/or one or more of the steps 54a, 54b, 54c, a program such as, for example, a web browser, is executed by the processor 48ab of the user device 48a, thereby causing the web browser to access a website hosted by the computer 42, which website provides access to one or more programs and data stored in one or more of the computer readable medium 44, the database 46, and the engine 12.

Figure 5B:
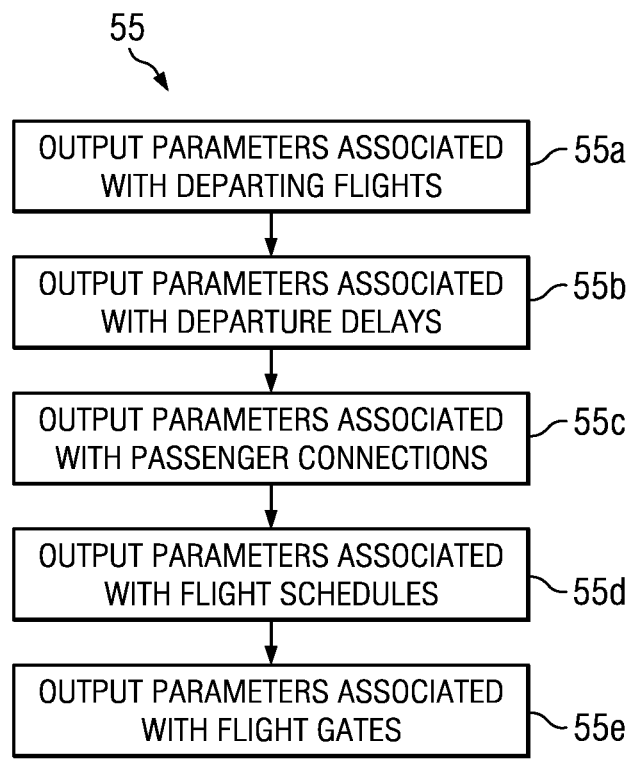
FIG. 5B is a flow chart illustration of the step of outputting one or more parameters in response to receiving station data of the method of FIG. 4, according to an exemplary embodiment.

In an exemplary embodiment, as illustrated in FIG. 5B with continuing reference to FIGS. 1-4, the step 55 includes outputting parameters associated with departing flights in step 55a, outputting parameters associated with departure delays in step 55b, outputting parameter associated with passenger connections in step 55c, outputting parameters associated with flight schedules in step 55d, and outputting parameters associated with flight gates in step 55e.

In an exemplary embodiment, to receive data associated with the selected station from one or more data sources in the step 54, to select or otherwise input the station in the step 54a, to search for flights in the step 54b, to load the data for the searched flights in step 54c and/or to execute any combination thereof, the module 14 receives and stores data in the database 46, with the data being received from one or more of the following data sources: the engine 12 of the system 10; one or more of the modules 16, 18, 20, 22, 24, 26, 28, 30, 32 and 34 of the system 10; one or more of the control towers 38a, 38b and 38c; a dispatch environmental control system (DECS) (not shown) and/or one or more computer systems, host-based systems and/or applications thereof; an enhanced reservation system (RES) (not shown) and/or one or more computer systems, host-based systems and/or applications thereof; the Federal Aviation Administration (FAA) (not shown) and/or one or more computer systems, host-based systems and/or applications thereof; off-schedule operations (FOS) (not shown) and/or one or more computer systems, host-based systems and/or applications thereof; the selected station; one or more other stations (not shown); a flight operating system (FOS) (not shown) and/or one or more computer systems, host-based systems and/or applications thereof; and an aircraft communication addressing and reporting system (AGARS) (not shown) and/or one or more computer systems, host-based systems and/or applications thereof.

In an exemplary embodiment, to receive data from one or more data sources in the step 54, data is accessed and/or received from the engine 12, but is not stored in the database 46. In an exemplary embodiment, to receive data from one or more data sources in the step 54, to select the station in the step 54a, to search for flights in the step 54b, to load the data for the searched flights in step 54c and/or any combination thereof, the module 14 accesses and/or receives data from the engine 12, the RES (not shown) and/or one or more computer systems, host-based systems and/or applications thereof, the DECS (not shown) and/or one or more computer systems, host-based systems and/or applications thereof, and/or any combination thereof. In an exemplary embodiment, to receive data from one or more data sources in the step 54, to select the station in the step 54a, to search for flights in the step 54b, to load the data for the searched flights in step 54c and/or any combination thereof, the module 14 accesses and/or receives data from the engine 12, which, in turn, accesses and/or receives data from one or more of the following data sources: one or more of the modules 16, 18, 20, 22, 24, 26, 28, 30, 32 and 34 of the system 10; one or more of the control towers 38a, 38b and 38c; one or more of the remote user devices 48a, 48b and 48c; the DECS (not shown) and/or one or more computer systems, host-based systems and/or applications thereof; the RES (not shown) and/or one or more computer systems, host-based systems and/or applications thereof; the Federal Aviation Administration (FAA) (not shown) and/or one or more computer systems, host-based systems and/or applications thereof; the OSO (not shown) and/or one or more computer systems, host-based systems and/or applications thereof; the selected station; one or more other stations (not shown); the FOS (not shown) and/or one or more computer systems, host-based systems and/or applications thereof; and the ACARS (not shown) and/or one or more computer systems, host-based systems and/or applications thereof.

In an exemplary embodiment, as illustrated in FIG. 6 with continuing reference to FIGS. 1-5, to select or otherwise input the airport at which the control tower 38a is located in the step 54a, a select station drop down menu 61 is displayed on the output device 48ac of the user device 48a, the select station drop down menu 61 is clicked and/or otherwise selected with the input device 48ad, and the airport 37a at which the control tower 38a is located is selected from the menu 61. In one embodiment, the remote airport 37b at which the control tower 38b is located may be selected or the remote airport 37c at which the control tower 38c is located may be selected.

To search for flights departing from the selected station at which the control tower 38a is located in the step 54b, a departing flights window 62 is displayed on the output device 48ac, a select flight range drop down menu 64 is clicked and/or otherwise selected with the input device 48ad, and the type of flight (for example, "expedited" or "delayed") is selected from the menu 64 and, in response, a query is issued for flights departing from, and that will depart from, the selected station. Alternately, to search in the step 54b for flights that have departed from, and that will depart from, the selected station, a search parameter drop down menu 66 is clicked and/or otherwise selected with the input device 48ad, a search parameter is entered into a search box 68 with the input device 48ad, a search category corresponding to a data field in the departing flights window 62 is selected from the drop down menu 66, or a search button 70 is clicked and/or otherwise selected with the input device 48ad and, in response, a query is automatically issued for flights meeting that search criteria (i.e. flights) departing from, and that will depart from, the selected station associated with control tower 38a.

To load the data for the flights departing from and arriving at the selected station in the step 54c, flight and gate data associated with the station selected in the step 54a and the flights meeting the search criteria searched in the step 54b, is automatically accessed and/or loaded, and displayed in the departing flights window 62 in the step 55.

To output parameters in the step 55, in response to the step 54, a plurality 71 of rows is automatically displayed in the departing flights window 62, each row corresponding to a flight meeting the search criteria in the step 54b. In each row in the plurality 71, parameters associated with departing flights are displayed in the step 55a, namely: flight number ("Flight"), destination airport ("Dest"), a cost index ("CI") and downline destination ("DnlDest"). In each row in the plurality 71, parameters associated with departure delays are displayed in step 55b, namely departure delay ("DepDly"). In each row in the plurality 71, parameters associated with passenger connections are displayed in step 55c, namely: potential missed passenger connections ("MisCnx"), minimum minutes to delay a departure for at least one more passenger to connect ("HoldCx"), and maximum additional hold time that will allow a flight to meet a certain arrival time goal ("HoldAO"). In each row in the plurality 71, parameters associated with flight schedules are displayed in step 55d, namely: scheduled departure time ("SchDep"), latest posted departure time ("LatDep"), target departure time ("TgT"), projected departure time ("PrjDep"), scheduled arrival time ("SchArv"), latest posted arrival time ("LatArv"), scheduled block time ("SchBlk"), the difference between the scheduled block time and the latest published block time ("BlkDiff"), downline turn time ("DnlTurn"), and downline slack time ("Slack"). In each row in the plurality 71, parameters associated with flight gates are displayed in the step 55e, namely: departure gate ("DepGate") and arrival gate ("ArvGate"). In an exemplary embodiment, as shown in FIG. 6, the parameters outputted in the step 55 are arranged in columns, and departing flights are arranged in rows.

In several exemplary embodiments, the operation of the system 36 in whole or in part, the operation of the module 14 in whole or in part, the execution of the method 52 in whole or in part, and/or any combination thereof, display the categories of data in the departing flights window 62 to an airline traffic operator to improve the management of the flights and improve customer service.

In an exemplary embodiment, the departing flight window 62 shown in FIG. 6 is initially automatically displayed on the output device 48ac in response to the initial operation of the module 14 with the user device 48a, the initial execution of the step 54 with the user device 48a, the initial execution of the method 52 with the user device 48a, the initial execution of the step 55 with the user device 48a, and/or any combination thereof.

In an exemplary embodiment, during the execution of the method 52 including the steps 54, 55, 56, 57, 58 and 59 the data received in the step 54 is continually and automatically updated, continually and automatically updated at predetermined time intervals such as, for example, every 45 seconds, and/or any combination thereof, thereby ensuring that the data received in the step 54 remains current and accurate. In an exemplary embodiment, the step 54 further includes refreshing the received data with recent updates of the data from the aforementioned one or more data sources, issuing one or more queries for updated data from the one or more data sources, issuing one or more queries for updated data from the one or more data sources at predetermined time intervals such as, for example, every 45 seconds, issuing one or more queries for all of the data previously received in the step 54, issuing one or more queries for all of the data previously received in the step 54 at predetermined time intervals such as, for example, every 45 seconds, and/or any combination thereof, automatically or otherwise. In an alternative embodiment, to update the data received in the step 54 for flights that have departed from, and that will depart from, the selected station, a get data button 72 is clicked and/or otherwise selected with the input device 48ad. In an exemplary embodiment, to repeat one or more of the steps 54, 54a, 54b, and 54c before, during or after one or more of the steps 55, 56, 57, 58 and 59, the get data button 72 is clicked and/or otherwise selected.

Figure 7:
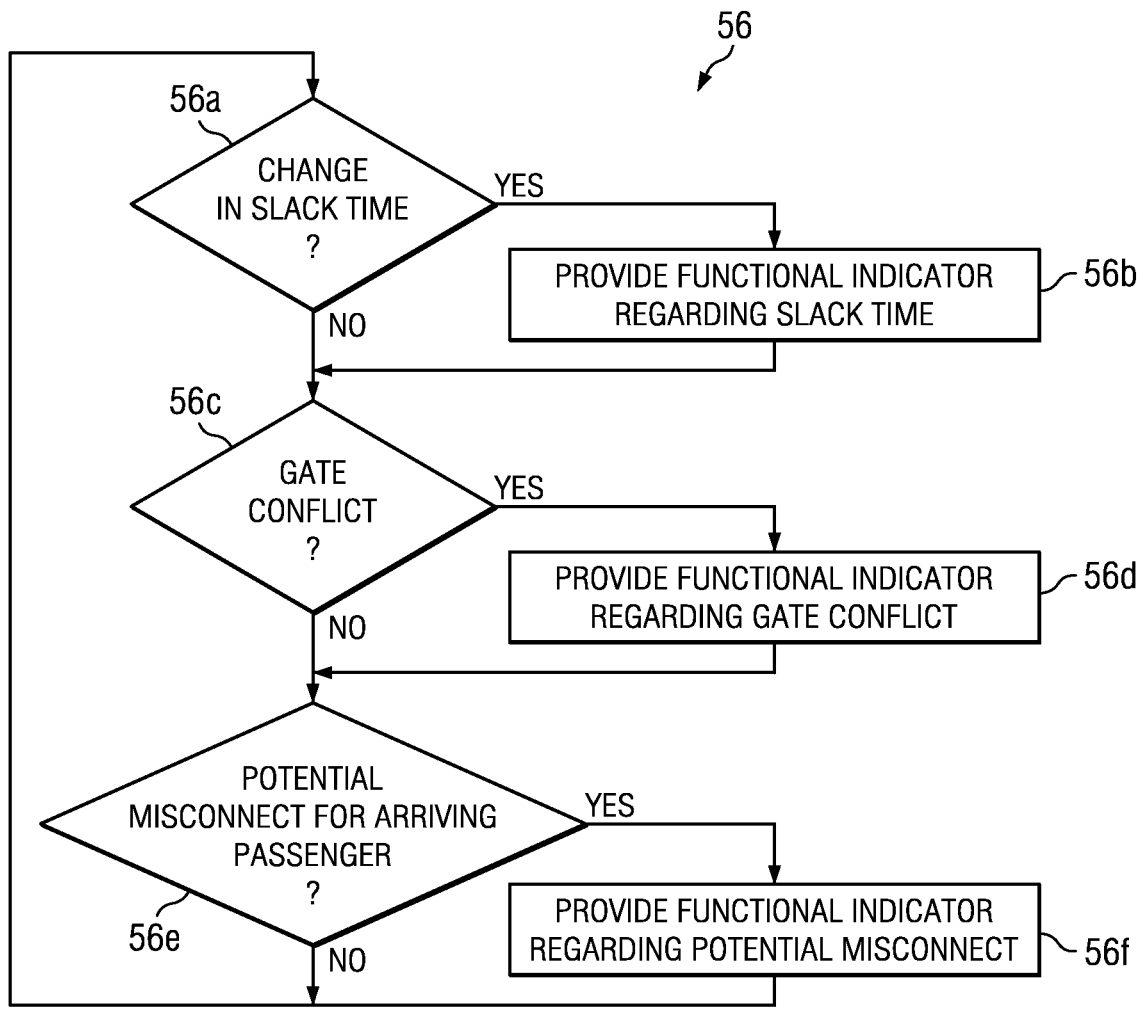
FIG. 7 is a flow chart illustration of the steps of providing one or more functional indicators of the method of FIG. 4, according to an exemplary embodiment.

In an exemplary embodiment, as illustrated in FIG. 7 with continuing reference to FIGS. 1-6, to provide one or more functional indicators specific to the selected station in the step 56 of the method 52, it is determined in step 56a whether the slack time (the time between the maximum ready time for one of the departing flights and the projected departure time) has changed. If it is determined in the step 56a that the slack time of departure has indeed changed, then a functional indicator regarding the new slack time is outputted in step 56b. It is determined in step 56c whether or not the schedule of a flight departing from the selected station is expected to cause a gate conflict at the selected station or downline stations; if so, then a functional indicator regarding the gate conflict is outputted in step 56d. It is determined in step 56e whether or not one or more of the arriving passengers scheduled to connect with the selected flight are projected to be unable to connect with the a flight departing from the selected station prior to departure. If so, then a functional indicator regarding the potential misconnect is outputted in step 56f.

Figure 10:
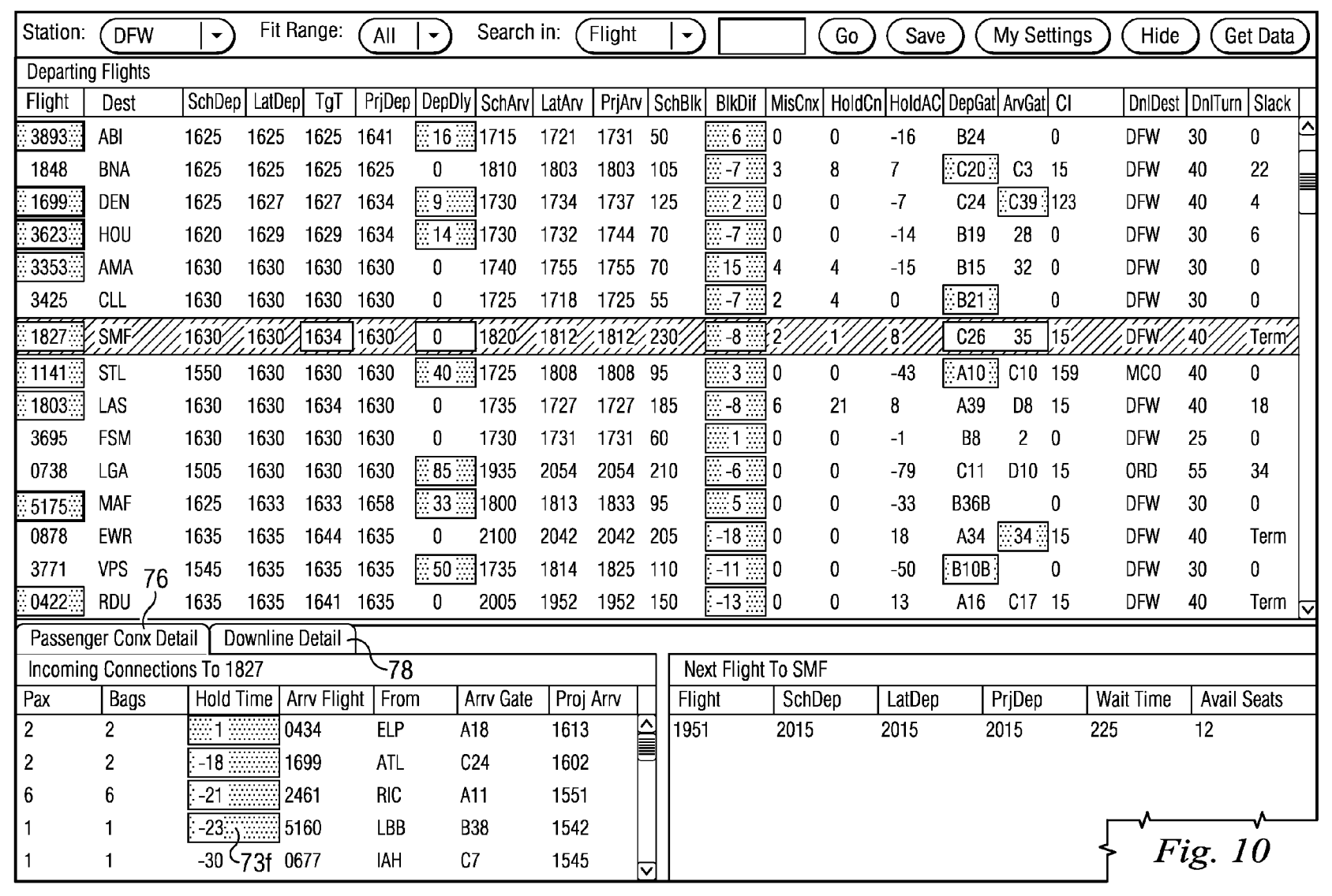

In an exemplary embodiment, functional indicators 73a, 73b, 73c, 73d and 73e as illustrated in FIGS. 6, and 73f, as illustrated in FIG. 10, take the form of a distinct background color in one or more cells in one or more columns displayed on the output device 48ac. In an exemplary embodiment, the functional indicators 73a, 73b, 73c, 73d, 73e and 73f may be of a different form (e.g., different color), depending of the length or severity of the departure delay, potential misconnect, or gate conflict. In one exemplary embodiment, to provide the functional indicator 73a in the step 56b, the background color behind the flight number data field indicates slack time, where pink indicates minimum objective ground time, brown indicates zero to five minutes slack, yellow indicates five to 10 minutes slack, blue indicates 10 to 15 minutes slack, gray indicates 15 to 25 minutes slack, and white indicates 26 or more minutes slack. In one exemplary embodiment, to provide the functional indicator 73b, the background color behind each entry in the departure delay data field is red if the departure delay is greater that zero minutes, white if the departure delay is zero minutes, and green if the departure delay is less that zero minutes. In one exemplary embodiment, to provide functional indicator 73c, the background color behind each entry in the block difference data field is red if the scheduled block time is less than the latest posted block time in the flight plan and green if the scheduled block time is greater than the latest posted block time in the flight plan.

In one exemplary embodiment, to provide functional indicators 73d and 73e in the step 56d, the background colors behind each entry in the departure gate and arrival gate data fields indicate if a gate conflict will exist when a flight's departure is delayed. In one exemplary embodiment, the background color behind each entry in the departure gate and arrival gate data fields is pink if a gate conflict currently exists, brown if a gate conflict will result if flight is delayed zero to five minutes, yellow if a gate conflict will result if flight is delayed 5-10 minutes, blue if a gate conflict will result if flight is delayed 10-15 minutes, gray if a gate conflict will result if flight is delayed 15-25 minutes, and white if a gate conflict will result if flight is delayed 26 or more minutes.

In one exemplary embodiment, to provide a functional indicator in the step 56f, a number other than zero is displayed in the column in the departing flights window 62 that corresponds to the number to inbound connecting passenger who are likely to miss a departing flight ("MisCnx").

In another exemplary embodiment, to provide a functional indicator in the step 56b, 56d or 56f, a dialog box is displayed on the output device 48ac, the dialog box including a message indicating that, for example, the slack time of a departing flight has changed and displaying the old projected time of departure and the new projected time of departure. The dialog box is a pop-up window which is at least partially displayed over, and/or otherwise interrupts, any other application or program being run, displayed and/or otherwise operated with the user device 48a.

In an exemplary embodiment, the steps 56a, 56c and 56e are continuously and simultaneously or nearly simultaneously executed, and the steps 56b, 56d and 56f are continuously and simultaneously executed as necessary.

In an exemplary embodiment, the step 56 provides automatic immediate notification of flight cancellations, delays and gate changes, thereby enabling the user of the user device 48a such as, for example, the airline traffic operator in control tower 38a, to receive critical operational information just as fast as passengers may receive the same information via cell phones, personal digital assistants, computers, etc.

Figure 8A:
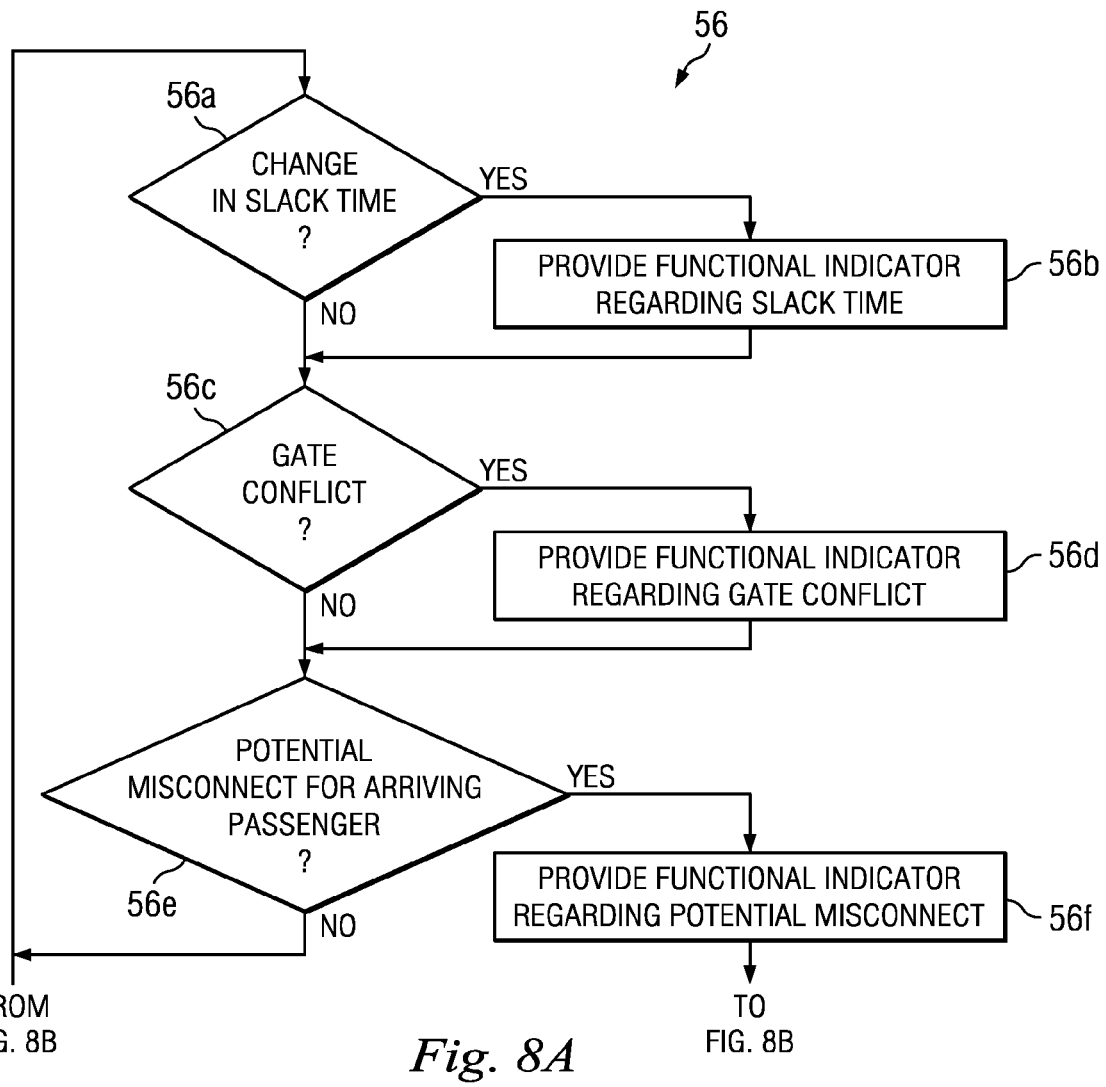
Figure 8B:
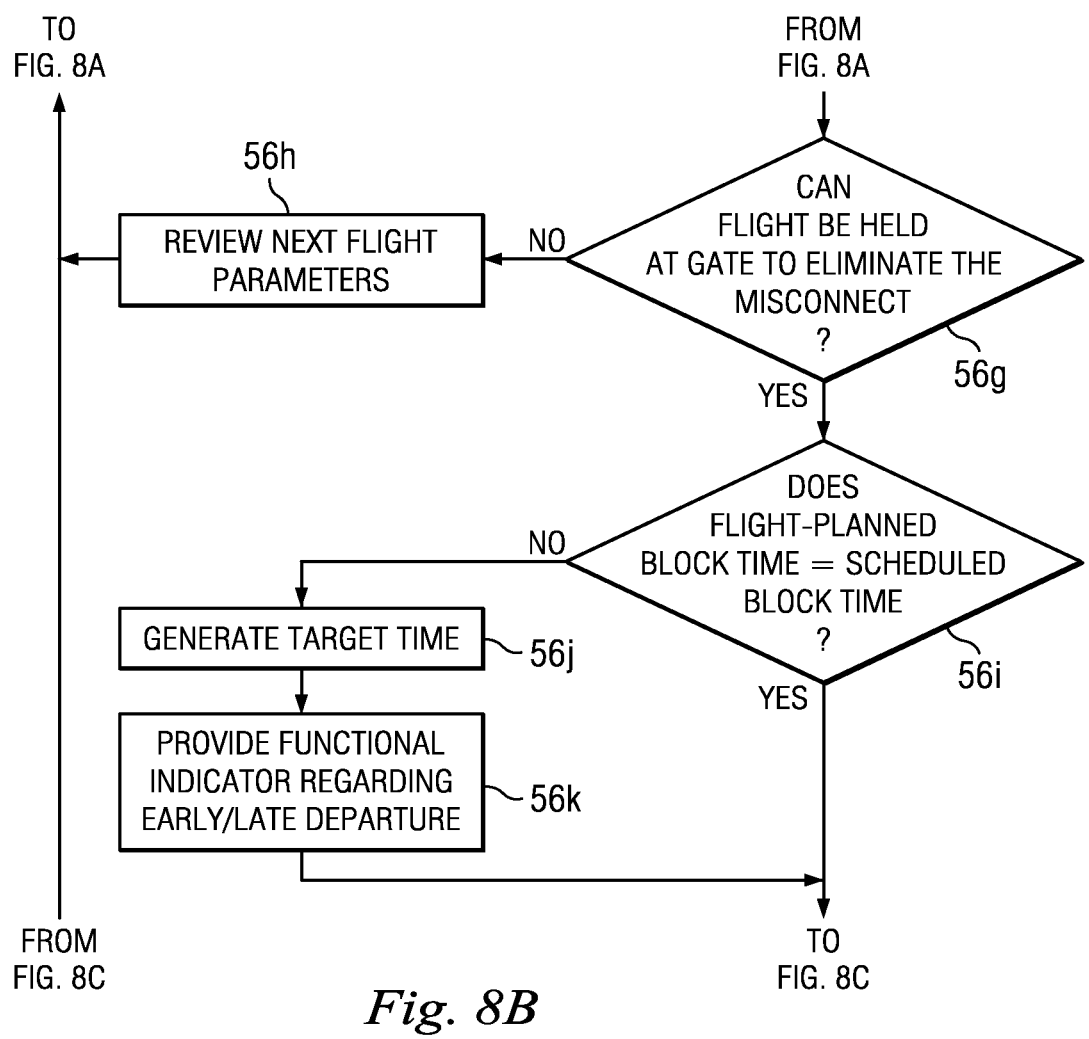

In an exemplary embodiment, as illustrated in FIGS. 8A, 8B and 8C with continuing reference to FIGS. 1-7, in addition to including the steps 56a, 56b, 56c, 56d, 56e and 56f, the step 56 further includes determining whether an airplane can be held at the station to likely eliminate one or more missed connections for passengers in step 56g and, if not, reviewing next flight parameters to facilitate the rebooking of the misconnecting passengers in step 56h. If it is determined in the step 56g that holding a departing airplane will likely result in the elimination of a missed connection, then it is determined in the step 56i if there is a difference between the flight-planned block time and the scheduled block time. If so, then a target time of departure for the relevant departing airline flight is generated in step 56j. In an exemplary embodiment, if the flight-planned block time is shorter than the scheduled block time, then a functional indicator that the departure of the airline flight can be delayed until the target time of departure is displayed on the output device in step 56k. In an exemplary embodiment, if the flight-planned block time is longer than the scheduled block time, then a functional indicator that the airline flight can depart earlier at the target time of departure is displayed on the output device proximate in step 56k. In one embodiment, to provide a functional indicator in the step 56k, a number is displayed in the column in departing flights window 62 that corresponds to maximum minutes to delay a departure for at least one more passenger to connect ("HoldCnx"). In another embodiment, to provide a functional indicator in the step 56k, functional indicator 73f is provided by changing the background color behind each entry in the Hold Time data field, as illustrated in FIG. 10.

In an exemplary embodiment, if the flight-planned block time is less than the scheduled block time, to generate the target time in the step 56j, an amount of time, or a hold time, is added the projected time of departure of a flight, which is displayed in the projected time of departure data parameter field in the group 62. In an exemplary embodiment, a hold time is added if the flight-planned block time is less than the scheduled block time by a predetermined amount of time such as, for example, greater than or equal to four (4) minutes. The hold time is equal to a percentage such as, for example, 50%, of the difference between the flight-planned block time and the scheduled block time; however, if the departing flight is terminating at its arrival location, then the hold time is the full difference between the flight-planned block time and the scheduled block time plus another amount of time such as, for example, ten (10) minutes, if additional misconnects can be protected.

Instead of adding a hold time to the estimated time of departure in the step 56j, an amount of time, or an early time, is subtracted from the projected time of departure in the step 58l if the flight-planned block time is longer than the scheduled block time. In an exemplary embodiment, the early time equals the full difference between the flight-planned and scheduled block times. In an exemplary embodiment, the early time equals the full difference between the flight-planned and scheduled block times up to a maximum amount of time such as, for example, five (5) minutes or ten (10) minutes. In an exemplary embodiment, the determination of the early time allows adequate time for connecting crew and connecting passengers, and ensures that no customer will have less than twenty five (25) minutes to connect the relevant departing flight. In an exemplary embodiment, the probable arrival time is generated in the step 56j by adjusting the estimated time of departure by the early time, with the early time adjustment being partially dependent upon one or more parameters associated with alternate flights, inbound flight connections, downline flight connections, passenger connections, inbound crew, inbound aircraft, and/or any combination thereof.

In several exemplary embodiments, the target time is determined in view of customers, bags, gates, arrival dependability, resource availability, downline station ground time, alternate flights, inbound flight connections, downline flight connections, passenger connections, inbound crew, inbound aircraft, and/or any combination thereof.

A probable arrival time is generated in step 56l based on the previously projected arrival time and anticipated effect of the hold, in any. In an exemplary embodiment, the probable arrival time is generated in the step 56l by adjusting the projected time of departure by the hold time, with the hold time adjustment being partially dependent upon one or more parameters associated with alternate flights, inbound flight connections, downline flight connections, passenger connections, inbound crew, inbound aircraft, and/or any combination thereof.

It is then determined in step 56m whether or not the probable time of arrival for one or more of the departing flights at their respective next stations is past the respective scheduled times of arrival. If not, then a hold message is outputted in step 56r by the user device 48a or by a person or device in communication with user device 48a. If so, then a probable time of arrival for the relevant departing flight is outputted in step 56n.

The hold message outputted in the step 56r or other step(s) is any type of communication that results in an airplane being held at the gate in order to reduce potential missed passenger, crew, and/or bag connections. In an exemplary embodiment, a hold message is sent by the operator of user device 48a in control tower 38a via the Internet, local area network, wireless network, voice network, data network, and/or any combination thereof, to an airline gate agent assigned to oversee the boarding and departure of the airplane to be held.

A probable departure time is then generated in step 56o based on the previously projected departure time and anticipated effect of the hold. In an exemplary embodiment, the probable arrival time is generated in the step 56o by adjusting the projected time of departure by the hold time, with the hold time adjustment being partially dependent upon one or more parameters associated with alternate flights, inbound flight connections, downline flight connections, passenger connections, inbound crew, inbound aircraft, and/or any combination thereof.

It is then determined in the step 56p whether or not the probable time of departure at the next station for one or more departing flight is past their respective scheduled times of departure. If so, then a probable time of departure for the selected flight is generated and outputted in step 56q and then a hold message is outputted in step 56r by the user device 48a or by a person or device in communication with user device 48a. If it is determined in the step 56p that the estimated time of departure at the next station is not past the scheduled time of departure, then a hold message is outputted in step 56r by the user device 48a or by a person or device in communication with user device 48a. In several exemplary embodiments, one or more of the steps 56j, 56l, and 56o are combined.

In an exemplary embodiment, the steps 56a, 56c, 56g, 56i, 56m, and 56p are continuously and simultaneously or nearly simultaneously executed, and the steps 56b, 56d, 56f, 56h, 56j, 56k, 56m, 56l, 56n, 56o, 56q and 56r are continuously and simultaneously executed as necessary. In several exemplary embodiments, the steps 56a, 56c, 56g, 56i, 56m, and 56p are executed in whole or in part with the engine 12.

In an exemplary embodiment, as illustrated in FIG. 9A with continuing reference to FIGS. 1-8, the step 57 includes selecting an airline flight from the search results in step 57a, the airline flight selected in the step 57a being hereinafter referred to as "the selected flight," and loading data for the selected flight in step 57b.

In an exemplary embodiment, to execute the step 57 and/or one or more of the steps 57a and 57b a program such as, for example, a web browser, is executed by the processor 48ab of the user device 48a, thereby causing the web browser to access a website hosted by the computer 42, which website provides access to one or more programs and data stored in one or more of the computer readable medium 44, the database 46, and the engine 12.

In an exemplary embodiment, as illustrated in FIG. 9B with continuing reference to FIGS. 1-8, the step 58 includes outputting parameters associated with passenger connections in step 58a, and outputting parameters associated with downline schedule in step 58b. The downline schedule comprises the scheduled arrival and departure times of the near-future flights to be assigned to the aircraft currently assigned to the selected flight.

In an exemplary embodiment, as illustrated in FIG. 10 with continuing reference to FIGS. 1-9, to select a flight that will depart from the selected station in the step 57a from the results of the search performed in the step 54b, a flight is selected by clicking and/or otherwise selecting a data set 74 (for example, by selecting a row) outputted in the departing flights window 62 in step 55.

As a result, additional data associated with the flight selected in the step 57a is accessed and/or loaded in step 57b. In one embodiment, steps 54a, 54b and 54c may be omitted by entering a flight number into the search box 68, and selecting "Flight" from the drop down menu 66; and as a result, only the flight data corresponding to the inputted flight number is displayed in the departing flight window 62 in step 55 in response to clicking and/or otherwise selecting the search button 70.

In an exemplary embodiment, to receive data associated with the selected flight from one or more data sources in the step 57, to select or otherwise input the flight in the step 57a, to load the data for the searched flight in step 57b and/or to execute any combination thereof, the module 14 receives and stores data in the database 46, with the data being received from one or more of the following data sources: the engine 12 of the system 10; one or more of the modules 16, 18, 20, 22, 24, 26, 28, 30, 32 and 34 of the system 10; one or more of the control towers 38a, 38b and 38c; a dispatch environmental control system (DECS) (not shown) and/or one or more computer systems, host-based systems and/or applications thereof; an enhanced reservation system (RES) (not shown) and/or one or more computer systems, host-based systems and/or applications thereof; the Federal Aviation Administration (FAA) (not shown) and/or one or more computer systems, host-based systems and/or applications thereof; off-schedule operations (OSO) (not shown) and/or one or more computer systems, host-based systems and/or applications thereof; the selected station; one or more other stations (not shown); a flight operating system (FOS) (not shown) and/or one or more computer systems, host-based systems and/or applications thereof; and an aircraft communication addressing and reporting system (ACARS) (not shown) and/or one or more computer systems, host-based systems and/or applications thereof. In an exemplary embodiment, to receive data from one or more data sources in the step 57, data is accessed and/or received from the engine 12, but is not stored in the database 46.

In an exemplary embodiment, to receive data from one or more data sources in the step 57, to select the flight in the step 57a, to load the data for the selected flights in step 57b and/or any combination thereof, the module 14 accesses and/or receives data from the engine 12, the RES (not shown) and/or one or more computer systems, host-based systems and/or applications thereof, the DECS (not shown) and/or one or more computer systems, host-based systems and/or applications thereof, and/or any combination thereof. In an exemplary embodiment, to receive data from one or more data sources in the step 57, to select the flight in the step 57a, to load the data for the selected flights in step 57b and/or any combination thereof, the module 14 accesses and/or receives data from the engine 12, which, in turn, accesses and/or receives data from one or more of the following data sources: one or more of the modules 16, 18, 20, 22, 24, 26, 28, 30, 32 and 34 of the system 10; one or more of the control towers 38a, 38b and 38c; one or more of the remote user devices 48a, 48b and 48c; the DECS (not shown) and/or one or more computer systems, host-based systems and/or applications thereof; the RES (not shown) and/or one or more computer systems, host-based systems and/or applications thereof; the Federal Aviation Administration (FAA) (not shown) and/or one or more computer systems, host-based systems and/or applications thereof; the OSO (not shown) and/or one or more computer systems, host-based systems and/or applications thereof; the selected station; one or more other stations (not shown); the FOS (not shown) and/or one or more computer systems, host-based systems and/or applications thereof; and the ACARS (not shown) and/or one or more computer systems, host-based systems and/or applications thereof.

In an exemplary embodiment, as illustrated in FIG. 11A with continuing reference to FIGS. 1-10, to output parameters associated with passenger connections in the step 58a, a group 76 of passenger data parameter fields is displayed on the output device 48ac, the group 76 including an incoming passenger data parameter field 76a indicating the number of passengers for each arriving fight with a passenger connecting to the selected flight, an incoming bag data parameter field 76b indicating the of number bags for each arriving fight with a bag connecting to the selected flight, a hold time data parameter field 76c indicating the estimated amount of time the selected flight must be held to ensure the passenger(s) and bag(s) from the arriving flight(s) will successfully connect with the selected flight, an arrival flight data parameter field indicating the flight number of the arriving flight, an arriving from city data parameter field indicating the city from which the arriving flight will arrive, an arrival gate data parameter field indicating the gate number of the arriving flight, a projected time data parameter field indicating the projected time of arrival for the arriving flight, and a next flight data parameter field 76d indicating the next scheduled flight(s) to the same destination as the selected flight.

In an exemplary embodiment, the next flight time data parameter field 76d includes several data parameters associated with alternate flights in one or more rows are displayed on the output device 48ac, with each row in the one or more rows including data parameter fields associated with a specific alternate flight having an arrival location which is the same as the arrival location of the selected flight associated with the group 76. Each row in the one or more rows includes a flight number data parameter field identifying the flight number of a specific alternate flight having an arrival location which is the same as the arrival location of the selected flight, a scheduled departure time data parameter field indicating the scheduled departure time of the specific alternate flight, a published time of departure data parameter field indicating the most recent posted time of departure of the specific alternate flight, a projected time of departure data parameter field indicating the projected time of departure of the specific alternate flight, a wait time data parameter field indicating the amount of wait time before the specific alternate flight is projected to depart, and an available seats data parameter field indicating the quantity of available seats on the specific alternate flight. In an exemplary embodiment, the step 56 greatly facilitates the rerouting and/or rebooking of customers who were originally scheduled to depart on the selected flight.

In an exemplary embodiment, by displaying the group 76 on the output device 48ac, critical and/or helpful operational information associated with the selected flight is quickly and easily communicated to a user of the user device 48a such as, for example, the airline traffic operator in the control tower 38a, who, in turn, can quickly and easily communicate the operational information to others such as, for example, airline gate agents and airline passengers.

In an exemplary embodiment, as illustrated in FIG. 11B with continuing reference to FIGS. 1-10, to output parameters associated with downline schedule in the step 58b, a group 78 of downline data parameter fields is displayed on the output device 48ac, the group 78 including a delay sequence data parameter field 78a containing information regarding the downline schedule of the aircraft assigned to the selected flight, an arriving aircraft data parameter field 78b containing the previous flight information of the aircraft arriving to be assigned to the selected flight and the downline flights displayed in field 78a, an arriving cockpit crew data parameter field 78c containing the previous flight information of the cockpit crew arriving to be assigned to the selected flight, as well as the downline flights displayed in field 78a, an arriving cabin crew data parameter field 78d containing the previous flight information of the cabin crew arriving to be assigned to the selected flight, as well as the downline flights displayed in field 78a. In an exemplary embodiment, the information in delay sequence data parameter field 78a is calculated by the Estimated Time of Departure (ETD) functional module 16. The Estimated Time of Departure (ETD) functional module 16 propagates known upline delays to downline flights from downline stations, and calculates a new projected departure time for the downline flights listed in delay sequence data parameter field 78a. In an exemplary embodiment, a symbol such as, for example, an asterisk (*) is displayed in the field 78c if the members of the inbound cockpit crew are not all arriving on the same flight; if the symbol is displayed, then data associated with the latest flight that a member will arrive on is displayed in the field 78c. In an exemplary embodiment, a symbol such as, for example, an asterisk (*) is displayed in the field 78d if the members of the inbound flight attendant crew are not all arriving on the same flight; if the symbol is displayed, then data associated with the latest flight that a member will arrive on is displayed in the field 78d. In an exemplary embodiment, by displaying the field 78 on the output device 48ac in the step 58, critical and/or helpful operational information associated with the selected flight is quickly and easily communicated to a user of the user device 48a such as, for example, the airline traffic operator in control tower 38a, who, in turn, can quickly and easily communicate the operational information to others such as, for example, airline gate agents and airline passengers.

In an exemplary embodiment, the one or more rows are displayed in the departing flight window 62 on the output device 48ac in the step 55 before, during or after the display of the group 76 on the output device 48ac in the step 58.

In an exemplary embodiment, the one or more rows are displayed in the departing flight window 62 on the output device 48ac in the step 55 before, during or after the display of the group 78 on the output device 48ac in the step 58.

In an exemplary embodiment, to perform the step 59, a functional indicator 73f takes the form of a distinct background color in one or more cells in one or more columns displayed on the output device 48ac. In one embodiment, to provide a functional indicator in the step 56k, the functional indicator 73f is provided by changing the background color behind each entry in the Hold Time data field. In an exemplary embodiment, the functional indicator 73f may be of a different form (e.g., different color), depending of the length of the hold time. In several exemplary embodiments, the respective executions of the step 56 and the step 59 occur simultaneously, serially and/or any combination thereof.

As noted above, in an exemplary embodiment, during the execution of the method 52 including the steps 54, 55, 56, 57, 58 and 59, the data received in the step 54 and the step 57 is continually updated at predetermined time intervals such as, for example, every 45 seconds, and/or any combination thereof, thereby ensuring that the data received in the step 54 and the step 57 remains current and accurate; in an exemplary embodiment, the step 54 and the step 57 further include refreshing the received data with recent updates of the data from the aforementioned one or more data sources, issuing one or more queries for updated data from the one or more data sources, issuing one or more queries for updated data from the one or more data sources at predetermined time intervals such as, for example, every 45 seconds, issuing one or more queries for all of the data previously received in the step 54 or in the step 57, issuing one or more queries for all of the data previously received in the step 54 or in the step 57 at predetermined time intervals such as, for example, every 45 seconds, and/or any combination thereof. As a result, the one or more parameters outputted in the step 55 and the step 58 and the one or more functional indicators provided in the step 56 and in the step 59 are continually updated or refreshed, continually updated or refreshed at predetermined time intervals such as, for example, every 45 seconds, and/or any combination thereof. In an alternative embodiment, to update the data received in the step 57 for the selected flight, a get data button 72 is clicked and/or otherwise selected with the input device 48ad. In an exemplary embodiment, to repeat one or more of the steps 57, 57a, and 57b before, during or after one or more of the steps 54, 55, 56, 58 and 59, the get data button 72 is clicked and/or otherwise selected.

In several exemplary embodiments, the method 52 is implemented by, or at least partially implemented by, the engine 12 and/or components thereof, the module 14 and/or components thereof, the user devices 48a, 48b and 48c and/or components thereof, and/or any combination thereof.

In an exemplary embodiment, an airline traffic operator can use the functional indicators, which are outputted in step 56 or step 59, to determine if he or she needs that time for permitting late-connecting passengers and/or bags to board the airplane, easing the boarding process. In an exemplary embodiment, functional indicators are not published or communicated externally, but are used for internal decision making only, with the airline traffic operator making the decision to hold flights based on his or her own discretion, without approval from management or operations. In an exemplary embodiment, during the step 56 or step 59, and in accordance with the foregoing, the airline traffic operator is alerted to the possibility of taking advantage of the flight-planned block time being shorter than the scheduled block time to improve customer service; the departure of the selected flight from the gate can be held to reduce misconnects and improve the boarding process. In several exemplary embodiments, if the hold message indicated in the step 56r is heeded by, for example, gate agents at airport 37a, customer service may be improved by allowing more flexibility to care for customers' needs, holding for connecting passengers and/or bags, and easing the boarding process; moreover, the gate agent is cautioned against departing on time, only to arrive early at the arrival location or downline station and burn fuel, and waste time, waiting for the assigned arrival gate to become available.

As noted above, the execution of the method 52 with the user device 48a at airport 37a is substantially similar to the execution of the method 52 with user device 48b at airport 37b, and is substantially similar to the execution of the method 52 with user device 48c at airport 37c. Therefore, the execution of the method 52 with each of the user devices 48b and 48c will not be described in detail. In several exemplary embodiments, the respective executions of the method 52 with each of user devices 48b and 48c, and/or portions thereof, occur simultaneously, serially and/or any combination thereof.

In several exemplary embodiments, the operation of the system 36 in whole or in part, the operation of the module 14 in whole or in part, the execution of the method 52 in whole or in part, and/or any combination thereof, allows an airline traffic operator to be proactively alerted to changes in airline operations, instead of having to rely on periodically checks of one or more applications and/or reservation systems for updates.

In several exemplary embodiments, the operation of the system 36 in whole or in part, the operation of the module 48 in whole or in part, the execution of the method 52 in whole or in part, and/or any combination thereof, includes providing additional information to, for example, an airline traffic operator, with such additional information including, for example, longer and/or more detailed explanations concerning reasons for any flight delays, a history of gate changes for a selected flight, a history of delays for a selected flight, etc.

In several exemplary embodiments, the operation of the system 36 in whole or in part, the operation of the module 48 in whole or in part, the execution of the method 52 in whole or in part, and/or any combination thereof, includes providing real-time airport surface movement data to, for example, an airline traffic operator. In several exemplary embodiments, the system 36 uses this data to identify and prioritize "high-value" departing flights. In these exemplary embodiments, departing flights are prioritized on the basis of arrival delay, downline connections, time slots, flight planning cost, curfew violations, crew legalities/layovers, misconnecting passengers, and other indicators. The relative importance of these indicators are distinguished by weight and then summed to generate a score value for each eligible departing flight at the station 37. Those departing flights with the highest score value become candidates for expedited departure. Ground controllers at the station 37 then attempt to jump high value departing flights ahead in the takeoff queue. In these exemplary embodiments, the score value for each eligible departing flight at the station 37 may be received at step 57 and then displayed on output device 48ac at step 58.

In several exemplary embodiments, the output device 48ac includes a screen or graphical display, and further includes a printer so that the airline traffic operator can selectively print some of the valuable information being provided by the module 14, the system 36, the execution of the method 52, and/or any combination thereof, or so that the information is automatically printed on the printer.

In an exemplary embodiment, the module 48 is a web-based application written in, for example, Java and Adobe Flex, which pulls real-time information from the engine 12, automatically refreshing with the latest information every, for example, 45 seconds, and control tower personnel can access the web-based application at a webpage via a link; as a result, control tower personnel can easily and quickly see any updates as soon, or almost as soon, as the updates occur, increasing the possibility that the control power personnel will know of updates before, or at the same time as, any gate agents, customers or passengers know of the updates.

In an exemplary embodiment, the operation of the system 36 in whole or in part, the operation of the module 14 in whole or in part, the execution of the method 52 in whole or in part, and/or any combination thereof, provides for the display of relevant real-time information in an easy-to-read format that does not require repeated requests on the part of an airline traffic operator to other applications or reservation systems, and further provides alerts such as, for example, pop-up messages, to notify gate airline traffic operators when changes are detected for a selected flight. In an exemplary embodiment, the operation of the system 36 in whole or in part, the operation of the module 14 in whole or in part, the execution of the method 52 in whole or in part, and/or any combination thereof, provides an automated process to make real-time flight information readily available to airline traffic operators and push updates to airline traffic operators in the form of, for example, pop-up messages; as a result, airline traffic operators have immediate access to real-time flight information such as, for example, inbound resource information, gate changes and departure delays, connecting passenger information, flight plan details, etc.; airline traffic operators can provide more accurate and timely information to customers regarding flight delays; and customers are more informed regarding flight delays, and what the airline is doing to handle the delays, and thus the customers are more at ease about their circumstances and have more confidence in the airline's ability to manage delays effectively.

In an exemplary embodiment, the module 14 is an Intranet-based program, a web-based application, and/or any combination thereof, and is designed to assist gate agents, displaying useful flight information in an easy-to-read format, which information is automatically updated every, for example, 45 seconds, thereby providing the gate agents with the most up-to-date information and eliminating, or at least reducing, repeated requests by gate agents to one or more reservation systems.

Figure 12:
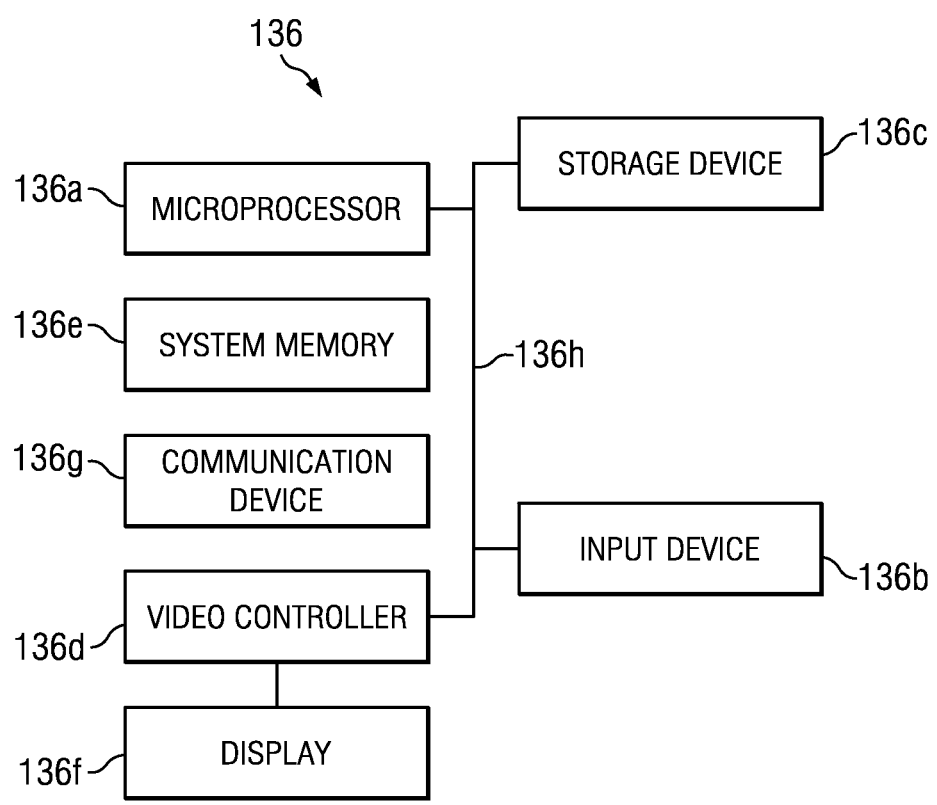
FIG. 12 is a diagrammatic illustration of a node for implementing one or more exemplary embodiments of the present disclosure, according to an exemplary embodiment.

In an exemplary embodiment, as illustrated in FIG. 12 with continuing reference to FIGS. 1-11, an illustrative node 136 for implementing one or more embodiments of one or more of the above-described networks, elements, methods and/or steps, and/or any combination thereof, is depicted. The node 136 includes a microprocessor 136a, an input device 136b, a storage device 136c, a video controller 136d, a system memory 136e, a display 136f, and a communication device 136g all interconnected by one or more buses 136h. In several exemplary embodiments, the storage device 136c may include a floppy drive, hard drive, CD-ROM, optical drive, any other form of storage device and/or any combination thereof. In several exemplary embodiments, the storage device 136c may include, and/or be capable of receiving, a floppy disk, CD-ROM, DVD-ROM, or any other form of computer-readable medium that may contain executable instructions. In several exemplary embodiments, the communication device 136g may include a modem, network card, or any other device to enable the node to communicate with other nodes. In several exemplary embodiments, any node represents a plurality of interconnected (whether by intranet or Internet) computer systems, including without limitation, personal computers, mainframes, PDAs, and cell phones. In several exemplary embodiments, one or more of the engine 12, the module 14, the user devices 48a, 48b and 48c, are, or at least include, the node 136 and/or components thereof, and/or one or more nodes that are substantially similar to the node 136 and/or components thereof.

In several exemplary embodiments, a computer system typically includes at least hardware capable of executing machine readable instructions, as well as the software for executing acts (typically machine-readable instructions) that produce a desired result. In several exemplary embodiments, a computer system may include hybrids of hardware and software, as well as computer sub-systems.

In several exemplary embodiments, hardware generally includes at least processor-capable platforms, such as client-machines (also known as personal computers or servers), and hand-held processing devices (such as smart phones, personal digital assistants (PDAs), or personal computing devices (PCDs), for example). In several exemplary embodiments, hardware may include any physical device that is capable of storing machine-readable instructions, such as memory or other data storage devices. In several exemplary embodiments, other forms of hardware include hardware sub-systems, including transfer devices such as modems, modem cards, ports, and port cards, for example.

In several exemplary embodiments, software includes any machine code stored in any memory medium, such as RAM or ROM, and machine code stored on other devices (such as floppy disks, flash memory, or a CD ROM, for example). In several exemplary embodiments, software may include source or object code. In several exemplary embodiments, software encompasses any set of instructions capable of being executed on a node such as, for example, on a client machine or server.

In several exemplary embodiments, combinations of software and hardware could also be used for providing enhanced functionality and performance for certain embodiments of the present disclosure. In an exemplary embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several exemplary embodiments, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine. In several exemplary embodiments, data structures are defined organizations of data that may enable an embodiment of the present disclosure. In an exemplary embodiment, a data structure may provide an organization of data, or an organization of executable code.

In several exemplary embodiments, the network 50, and/or one or more portions thereof, may be designed to work on any specific architecture. In an exemplary embodiment, one or more portions of the network 50 may be executed on a single computer, local area networks, client-server networks, wide area networks, internets, hand-held and other portable and wireless devices and networks.

In several exemplary embodiments, a database may be any standard or proprietary database software, such as Oracle, Microsoft Access, SyBase, or DBase II, for example. In several exemplary embodiments, the database may have fields, records, data, and other database elements that may be associated through database specific software. In several exemplary embodiments, data may be mapped. In several exemplary embodiments, mapping is the process of associating one data entry with another data entry. In an exemplary embodiment, the data contained in the location of a character file can be mapped to a field in a second table. In several exemplary embodiments, the physical location of the database is not limiting, and the database may be distributed. In an exemplary embodiment, the database may exist remotely from the server, and run on a separate platform. In an exemplary embodiment, the database may be accessible across the Internet. In several exemplary embodiments, more than one database may be implemented.

A system has been described that includes a plurality of airline stations, each of the airline stations comprising a control tower, and an output device located at the control tower; and a node comprising a processor and a computer readable medium operably coupled thereto, the computer readable medium comprising a plurality of instructions stored therein, the plurality of instructions being accessible to, and executable by, the processor, the plurality of instructions comprising instructions for receiving data associated with an airline station selected from the plurality of airline stations; instructions for in response to receiving data associated with the selected airline station, automatically outputting one or more parameters associated with the selected airline station, comprising instructions for automatically displaying on the output device located at the control tower of the selected airline station one or more parameters associated with a plurality of airline flights departing from the selected airline station; instructions for during outputting one or more parameters associated with the selected airline station, automatically providing one or more functional indicators associated with the selected airline station; instructions for receiving data associated with an airline flight selected from the plurality of airline flights departing from the selected airline station; and instructions for during outputting one or more parameters associated with the selected airline station, automatically outputting one or more parameters associated with the selected airline flight. In an exemplary embodiment, each airline flight in the plurality of airline flights departing from the selected airline station has a scheduled time of departure, a flight-planned block time, and a scheduled block time; wherein each airline flight employs an airplane having a projected time of arrival to the selected airline station; wherein instructions for automatically providing one or more functional indicators associated with the selected airline station comprise the following for each airline flight: instructions for if there is a change in the projected time of arrival of the airplane to the selected station, then automatically displaying on the output device located at the control tower of the selected airline station a functional indicator regarding the change in the projected time of arrival of the airplane to the selected station; instructions for if the projected time of arrival of the airplane to the selected station results in a potential missed passenger connection on another airline flight departing from the selected station, then automatically displaying on the output device located at the control tower of the selected airline station a functional indicator regarding the potential missed passenger connection; instructions for if the potential missed passenger connection can be eliminated by holding the another airline flight at the selected station, then automatically displaying on the output device located at the control tower of the selected airline station a functional indicator regarding holding the another airline flight at the selected station; and instructions for if there is a difference between the flight-planned block time and the scheduled block time, then generating a target time of departure of the airline flight; if the flight-planned block time is shorter than the scheduled block time, then displaying on the output device located at the control tower of the selected airline station a functional indicator indicating that the departure of the airline flight can be delayed until the target time of departure; and if the flight-planned block time is longer than the scheduled block time, then displaying on the output device located at the control tower of the selected airline station an functional indicator indicating that each airline flight can depart early at the target time of departure.

A method has been described that includes receiving data associated with an airline station selected from a plurality of airline stations; in response to receiving data associated with the selected airline station, automatically outputting one or more parameters associated with the selected airline station, comprising automatically displaying on an output device one or more parameters associated with a plurality of airline flights departing from the selected airline station; during outputting one or more parameters associated with the selected airline station, automatically providing one or more functional indicators associated with the selected airline station; receiving data associated with an airline flight selected from the plurality of airline flights departing from the selected airline station; and during outputting one or more parameters associated with the selected airline station, automatically outputting one or more parameters associated with the selected airline flight. In an exemplary embodiment, each airline flight in the plurality of airline flights departing from the selected airline station employs an airplane having a projected time of arrival to the selected airline station; and wherein automatically providing one or more functional indicators associated with the selected airline station comprises for each airline flight, if there is a change in the projected time of arrival of the airplane to the selected station, then automatically providing a functional indicator regarding the change in the projected time of arrival of the airplane to the selected station; and for each airline flight, if the projected time of arrival of the airplane to the selected station results in a potential missed passenger connection on another airline flight departing from the selected station, then automatically providing a functional indicator regarding the potential missed passenger connection. In an exemplary embodiment, automatically providing one or more functional indicators associated with the selected airline station further comprises for each airline flight, if the potential missed passenger connection can be eliminated by holding the another airline flight at the selected station, then automatically providing a functional indicator regarding holding the another airline flight at the selected station; and wherein automatically providing the functional indicator regarding the holding of the another airline flight comprises changing the background color in one or more areas displayed on the output device, wherein the color depends of the length of the potential hold of the another airline flight. In an exemplary embodiment, the method includes reordering a takeoff queue at the airline station in response to outputting one or more parameters associated with the selected airline flight. In an exemplary embodiment, the method includes holding the selected airline flight at the airline station in response to outputting one or more parameters associated with the selected airline flight. In an exemplary embodiment, each airline flight in the plurality of airline flights departing from the selected airline station has a scheduled time of departure, a flight-planned block time, and a scheduled block time; and wherein automatically providing one or more functional indicators associated with the selected airline station comprises for each airline flight, if there is a difference between the flight-planned block time and the scheduled block time, then generating a target time of departure of the airline flight; if the flight-planned block time is shorter than the scheduled block time, then displaying on the output device a functional indicator indicating that the departure of the airline flight can be delayed until the target time of departure; and if the flight-planned block time is longer than the scheduled block time, then displaying on the output device an indicator indicating that the airline flight can depart early at the target time of departure. In an exemplary embodiment, receiving data associated with the selected airline station comprises selecting the selected airline station; in response to selecting the selected airline station, automatically searching for airline flights departing from the selected airline station; and loading data for the selected airline station, wherein the one or more parameters associated with the plurality of airline flights departing from the selected airline station are automatically displayed in response to loading data for the selected airline station; wherein receiving data associated with the selected airline flight comprises selecting the selected airline flight from the plurality of airline flights departing from the selected airline station; and in response to selecting the selected airline flight, automatically loading data for the selected airline flight. In an exemplary embodiment, the method further comprises forecasting one or more times with an operational data source and forecasting engine; wherein the times are associated with a plurality of transportation operations, the plurality of transportation operations comprising the plurality of airline flights departing from the selected airline station; wherein receiving data associated with the selected airline station further comprises issuing a query for data associated with the selected airline station using the engine; and continually updating the loaded data for the selected airline station by automatically repeating the issuance of the query at a predetermined time interval; and wherein the parameters displayed on the output device are updated at the predetermined interval.

A system has been described that includes a computer readable medium comprising a plurality of instructions stored therein, the plurality of instructions comprising instructions for receiving data associated with an airline station selected from a plurality of airline stations; instructions for in response to receiving data associated with the selected airline station, automatically outputting one or more parameters associated with the selected airline station, comprising instructions for automatically displaying on an output device one or more parameters associated with a plurality of airline flights departing from the selected airline station; instructions for during outputting one or more parameters associated with the selected airline station, automatically providing one or more functional indicators associated with the selected airline station; instructions for receiving data associated with an airline flight selected from the plurality of airline flights departing from the selected airline station; and instructions for during outputting one or more parameters associated with the selected airline station, automatically outputting one or more parameters associated with the selected airline flight. In an exemplary embodiment, the system further comprises the plurality of airline stations, each of the airline stations comprising a control tower; and an output device located at the control tower; wherein the first-mentioned output device is located at the control tower of the selected airline station; and a node comprising a processor; and the computer readable medium; wherein the plurality of instructions stored in the computer readable medium is accessible to, and executable by, the processor. In an exemplary embodiment, the node comprises the output device. In an exemplary embodiment, each of the airline stations further comprises a user device located at the corresponding control tower, the user device comprising the corresponding output device; and wherein the system further comprises a network via which the node is operably coupled to, and in communication with, at least the user device located at the control tower of the selected airline station. In an exemplary embodiment, each airline flight in the plurality of airline flights departing from the selected airline station employs an airplane having a projected time of arrival to the selected airline station; and wherein instructions for automatically providing one or more functional indicators associated with the selected airline station comprise the following for each airline flight: instructions for if there is a change in the projected time of arrival of the airplane to the selected station, then automatically providing a functional indicator regarding the change in the projected time of arrival of the airplane to the selected station; and instructions for if the projected time of arrival of the airplane to the selected station results in a potential missed passenger connection on another airline flight departing from the selected station, then automatically providing a functional indicator regarding the potential missed passenger connection. In an exemplary embodiment, instructions for automatically providing one or more functional indicators associated with the selected airline station further comprise the following for each airline flight: instructions for if the potential missed passenger connection can be eliminated by holding the another airline flight at the selected station, then automatically providing a functional indicator regarding holding the another airline flight at the selected station; and wherein instructions for automatically providing the functional indicator regarding the holding of the another airline flight comprise instructions for changing the background color in one or more areas displayed on the output device, wherein the color depends of the length of the potential hold of the another airline flight. In an exemplary embodiment, each airline flight in the plurality of airline flights departing from the selected airline station has a scheduled time of departure, a flight-planned block time, and a scheduled block time; and wherein instructions for automatically providing one or more functional indicators associated with the selected airline station comprise the following for each airline flight: instructions for if there is a difference between the flight-planned block time and the scheduled block time, then generating a target time of departure of the airline flight; instructions for if the flight-planned block time is shorter than the scheduled block time, then displaying on the output device a functional indicator indicating that the departure of the airline flight can be delayed until the target time of departure; and instructions for if the flight-planned block time is longer than the scheduled block time, then displaying on the output device an indicator indicating that the airline flight can depart early at the target time of departure. In an exemplary embodiment, instructions for receiving data associated with the selected airline station comprise instructions for selecting the selected airline station; instructions for in response to selecting the selected airline station, automatically searching for airline flights departing from the selected airline station; and instructions for loading data for the selected airline station, wherein the one or more parameters associated with the plurality of airline flights departing from the selected airline station are automatically displayed in response to loading data for the selected airline station; wherein instructions for receiving data associated with the selected airline flight comprise instructions for selecting the selected airline flight from the plurality of airline flights departing from the selected airline station; and instructions for in response to selecting the selected airline flight, automatically loading data for the selected airline flight. In an exemplary embodiment, the plurality of instructions further comprises instructions for forecasting one or more times with an operational data source and forecasting engine; wherein the times are associated with a plurality of transportation operations, the plurality of transportation operations comprising the plurality of airline flights departing from the selected airline station; wherein instructions for receiving data associated with the selected airline station further comprise instructions for issuing a query for data associated with the selected airline station using the engine; and instructions for continually updating the loaded data for the selected airline station by automatically repeating the issuance of the query at a predetermined time interval; and wherein the parameters displayed on the output device are updated at the predetermined interval.

A system has been described that includes means for receiving data associated with an airline station selected from a plurality of airline stations; means for in response to receiving data associated with the selected airline station, automatically outputting one or more parameters associated with the selected airline station, comprising means for automatically displaying on an output device one or more parameters associated with a plurality of airline flights departing from the selected airline station; means for during outputting one or more parameters associated with the selected airline station, automatically providing one or more functional indicators associated with the selected airline station; means for receiving data associated with an airline flight selected from the plurality of airline flights departing from the selected airline station; and means for during outputting one or more parameters associated with the selected airline station, automatically outputting one or more parameters associated with the selected airline flight. In an exemplary embodiment, each airline flight in the plurality of airline flights departing from the selected airline station employs an airplane having a projected time of arrival to the selected airline station; and wherein means for automatically providing one or more functional indicators associated with the selected airline station comprises the following for each airline flight: means for if there is a change in the projected time of arrival of the airplane to the selected station, then automatically providing a functional indicator regarding the change in the projected time of arrival of the airplane to the selected station; and means for if the projected time of arrival of the airplane to the selected station results in a potential missed passenger connection on another airline flight departing from the selected station, then automatically providing a functional indicator regarding the potential missed passenger connection; and means for if the potential missed passenger connection can be eliminated by holding the another airline flight at the selected station, then automatically providing a functional indicator regarding holding the another airline flight at the selected station, comprising means for changing the background color in one or more areas displayed on the output device, wherein the color depends of the length of the potential hold of the another airline flight. In an exemplary embodiment, each airline flight in the plurality of airline flights departing from the selected airline station has a scheduled time of departure, a flight-planned block time, and a scheduled block time; and wherein means for automatically providing one or more functional indicators associated with the selected airline station comprises the following for each airline flight: means for if there is a difference between the flight-planned block time and the scheduled block time, then generating a target time of departure of the airline flight; means for if the flight-planned block time is shorter than the scheduled block time, then displaying on the output device a functional indicator indicating that the departure of the airline flight can be delayed until the target time of departure; and means for if the flight-planned block time is longer than the scheduled block time, then displaying on the output device an indicator indicating that the airline flight can depart early at the target time of departure.

It is understood that variations may be made in the foregoing without departing from the scope of the disclosure. For example, instead of, or in addition to transportation transactions often conducted in the course of airline industry business, aspects of the present disclosure are applicable and/or readily adaptable to transportation transactions conducted in other industries, including rail, bus, cruise and other travel or shipping industries, rental car industries, hotels and other hospitality industries, entertainment industries, and other industries. In an exemplary embodiment, aspects of the present disclosure are readily applicable and/or readily adaptable to a shipping transaction before, during or after which a ship travels from one port to another port and, in some case, on to one or more other ports. In an exemplary embodiment, aspects of the present disclosure are readily applicable and/or readily adaptable to a trucking transaction before, during or after which a truck travels from one location to another location and, in some case, on to one or more other locations. In an exemplary embodiment, aspects of the present disclosure are readily applicable and/or readily adaptable to a rail transaction before, during or after which a train travels from one city or station to another city or station and, in some cases, on to one or more other cities or stations. In an exemplary embodiment, aspects of the present disclosure are applicable and/or readily adaptable to a wide variety of transportation transactions such as, for example, an airline sequence, a leg of an airline sequence, an airline block, and/or any combination thereof.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, means-plus-function clauses are intended to cover the structures described herein as performing the recited function and not only structural equivalents, but also equivalent structures.

What is claimed is:

1. A system comprising:
a plurality of airline stations, each of the airline stations comprising:
a control tower, and
an output device located at the control tower;
and
a node comprising a processor and a computer readable medium operably coupled thereto, the computer readable medium comprising a plurality of instructions stored therein, the plurality of instructions being accessible to, and executable by, the processor, the plurality of instructions comprising:
instructions for receiving data associated with an airline station selected from the plurality of airline stations;
instructions for in response to receiving data associated with the selected airline station, automatically outputting one or more parameters associated with the selected airline station, comprising:
instructions for automatically displaying on the output device located at the control tower of the selected airline station one or more parameters associated with a plurality of airline flights departing from the selected airline station;
instructions for during outputting one or more parameters associated with the selected airline station, automatically providing one or more functional indicators associated with the selected airline station;
instructions for receiving data associated with an airline flight selected from the plurality of airline flights departing from the selected airline station;
and
instructions for during outputting one or more parameters associated with the selected airline station, automatically outputting one or more parameters associated with the selected airline flight;
wherein instructions for automatically providing one or more functional indicators associated with the selected airline station comprise:
instructions for determining whether a potential missed passenger connection from the selected airline flight to another airline flight, which departs from the selected station and arrives at a next airline station, can be eliminated by delaying the another airline flight at the selected station by a hold time; and
instructions for if the potential missed passenger connection can be eliminated by delaying the another airline flight at the selected station by the hold time, then:
generating a probable time of arrival of the another airline flight at the next airline station, the probable time of arrival being based on the hold time;

determining if the probable time of arrival of the another airline flight is later than a scheduled time of arrival of the another airline flight at the next airline station;

if the probable time of arrival of the another airline flight is not later than the scheduled time of arrival of the another airline flight at the next airline station, then displaying on the output device located at the control tower of the selected airline station a functional indicator indicating that a scheduled time of departure of the another airline flight can be delayed by the hold time;

if the probable time of arrival of the another airline flight is later than the scheduled time of arrival of the another airline flight at the next airline station, then:

displaying on the output device located at the control tower of the selected airline station a functional indicator indicating the probable time of arrival of the another airline flight at the next airline station;

generating a probable time of departure of the another airline flight from the selected airline station;

determining if delaying the another airline flight at the selected station by the hold time will affect respective scheduled times of departure of one or more airline flights at the next airline station;

if delaying the another airline flight at the selected station by the hold time will affect respective scheduled times of departure of one or more airline flights at the next airline station, then displaying on the output device located at the control tower of the selected airline station a functional indicator indicating the probable time of departure of the another airline flight; and if the hold will not affect respective scheduled times of departure of one or more airline flights at the next airline station, then displaying on the output device located at the control tower of the selected airline station a functional indicator indicating an output hold message;

and instructions for if the potential missed passenger connection cannot be eliminated by delaying the another airline flight at the selected station by the hold time, then:

reviewing one or more parameters associated with a third airline flight to facilitate the rebooking of a passenger associated with the potential missed passenger connection.

2. The system of claim 1 wherein each airline flight in the plurality of airline flights departing from the selected airline station has a scheduled time of departure, a projected time of departure, a flight-planned block time, and a scheduled block time;

wherein instructions for automatically providing one or more functional indicators associated with the selected airline station further comprise the following for each airline flight:

instructions for if there is a difference between the flight-planned block time and the scheduled block time, then:

if the flight-planned block time is shorter than the scheduled block time, then:

generating a first target time of departure of the airline flight, comprising adding a hold time to the projected time of departure to thereby calculate the first target time of departure, the hold time equaling at least a percentage of the difference between the flight-planned and scheduled block times; and displaying on the output device located at the control tower of the selected airline station a functional indicator indicating that the departure of the airline flight can depart late at the first target time of departure;

and if the flight-planned block time is longer than the scheduled block time, then:

generating a second target time of departure, comprising subtracting an early time from the projected time of departure to thereby calculate the second target time of departure, the early time equaling one of the following:

the difference between the flight-planned and scheduled block times, and a maximum amount of time that is less than the difference between the flight-planned and scheduled block times; and displaying on the output device located at the control tower of the selected airline station a functional indicator indicating that the airline flight can depart early at the second target time of departure.

3. A method comprising:

receiving, using a computer system, data associated with an airline station selected from a plurality of airline stations;

in response to receiving data associated with the selected airline station, automatically outputting, using the computer system, one or more parameters associated with the selected airline station, comprising:

automatically displaying on an output device one or more parameters associated with a plurality of airline flights departing from the selected airline station;

during outputting one or more parameters associated with the selected airline station, automatically providing, using the computer system, one or more functional indicators associated with the selected airline station;

receiving, using the computer system, data associated with an airline flight selected from the plurality of airline flights departing from the selected airline station;

and during outputting one or more parameters associated with the selected airline station, automatically outputting, using the computer system, one or more parameters associated with the selected airline flight;

wherein automatically providing one or more functional indicators associated with the selected airline station comprises:

determining whether a potential missed passenger connection from the selected airline flight to another airline flight, which departs from the selected station and arrives at a next airline station, can be eliminated by delaying the another airline flight at the selected station by a hold time; and if the potential missed passenger connection can be eliminated by delaying the another airline flight at the selected station by the hold time, then:

generating a probable time of arrival of the another airline flight at the next airline station, the probable time of arrival being based on the hold time;

determining if the probable time of arrival of the another airline flight is later than a scheduled time of arrival of the another airline flight at the next airline station;

if the probable time of arrival of the another airline flight is not later than a scheduled time of arrival of the another airline flight at the next airline station, then displaying on the output device located at the control tower of the selected airline station a functional indicator indicating that a scheduled time of departure of the another airline flight can be delayed by the hold time; and if the probable time of arrival of the another airline flight is later than the scheduled time of arrival of the another airline flight at the next airline station, then:

displaying on the output device located at the control tower of the selected airline station a functional indicator indicating the probable time of arrival of the another airline flight at the next airline station;

generating a probable time of departure of the another airline flight from the selected airline station;

determining if delaying the another airline flight at the selected station by the hold time will affect respective scheduled times of departure of one or more airline flights at the next airline station;

if delaying the another airline flight at the selected station by the hold time will affect respective scheduled times of departure of one or more airline flights at the next airline station, then displaying on the output device located at the control tower of the selected airline station a functional indicator indicating the probable time of departure of the another airline flight; and if the hold will not affect respective scheduled times of departure of one or more airline flights at the next airline station, then displaying on the output device located at the control tower of the selected airline station a functional indicator indicating an output hold message;

and if the potential missed passenger connection cannot be eliminated by delaying the another airline flight at the selected station by the hold time, then:

reviewing one or more parameters associated with a third airline flight to facilitate the rebooking of a passenger associated with the potential missed passenger connection.

4. The method of claim 3, further comprising:

in response to outputting one or more parameters associated with the selected airline flight, reordering a takeoff queue at the airline station.

5. The method of claim 3, further comprising:

in response to outputting one or more parameters associated with the selected airline flight, holding the selected airline flight at the airline station.

6. The method of claim 3 wherein each airline flight in the plurality of airline flights departing from the selected airline station has a scheduled time of departure, a projected time of departure, a flight-planned block time, and a scheduled block time; and wherein automatically providing one or more functional indicators associated with the selected airline station further comprises:

for each airline flight, if there is a difference between the flight-planned block time and the scheduled block time, then:

if the flight-planned block time is shorter than the scheduled block time, then:

generating a first target time of departure of the airline flight, comprising adding a hold time to the projected time of departure to thereby calculate the first target time of departure, the hold time equaling at least a percentage of the difference between the flight-planned and scheduled block times; and displaying on the output device a functional indicator indicating that the departure of the airline flight can depart late at the first target time of departure;

and if the flight-planned block time is longer than the scheduled block time, then:

generating a second target time of departure comprising subtracting an early time from the projected time of departure to thereby calculate the second target time of departure, the early time equaling one of the following:

the difference between the flight-planned and scheduled block times, and a maximum amount of time that is less than the difference between the flight-planned and scheduled block times; and displaying on the output device an indicator indicating that the airline flight can depart early at the second target time of departure.

7. The method of claim 3 wherein receiving data associated with the selected airline station comprises:

selecting the selected airline station;

in response to selecting the selected airline station, automatically searching for airline flights departing from the selected airline station; and loading data for the selected airline station, wherein the one or more parameters associated with the plurality of airline flights departing from the selected airline station are automatically displayed in response to loading data for the selected airline station;

wherein receiving data associated with the selected airline flight comprises:

selecting the selected airline flight from the plurality of airline flights departing from the selected airline station; and in response to selecting the selected airline flight, automatically loading data for the selected airline flight.

8. The method of claim 7 further comprising:

forecasting one or more times with an operational data source and forecasting engine;

wherein the times are associated with a plurality of transportation operations, the plurality of transportation operations comprising the plurality of airline flights departing from the selected airline station;

wherein receiving data associated with the selected airline station further comprises:

issuing a query for data associated with the selected airline station using the engine; and continually updating the loaded data for the selected airline station by automatically repeating the issuance of the query at a predetermined time interval; and wherein the parameters displayed on the output device are updated at the predetermined interval.

9. A system comprising:
a computer readable medium that is non-transitory, the computer readable medium comprising a plurality of instructions stored therein, the plurality of instructions comprising:
   instructions for receiving data associated with an airline station selected from a plurality of airline stations;
   instructions for in response to receiving data associated with the selected airline station, automatically outputting one or more parameters associated with the selected airline station, comprising:
      instructions for automatically displaying on an output device one or more parameters associated with a plurality of airline flights departing from the selected airline station;
      instructions for during outputting one or more parameters associated with the selected airline station, automatically providing one or more functional indicators associated with the selected airline station;
      instructions for receiving data associated with an airline flight selected from the plurality of airline flights departing from the selected airline station; and
      instructions for during outputting one or more parameters associated with the selected airline station, automatically outputting one or more parameters associated with the selected airline flight
   wherein instructions for automatically providing one or more functional indicators associated with the selected airline station comprise:
      instructions for determining whether a potential missed passenger connection from the selected airline flight to another airline flight, which departs from the selected station and arrives at a next airline station, can be eliminated by delaying the another airline flight at the selected station by a hold time; and
      instructions for if the potential missed passenger connection can be eliminated by delaying the another airline flight at the selected station by the hold time, then:
         generating a probable time of arrival of the another airline flight at the next airline station, the probable time of arrival being based on the hold time;
         determining if the probable time of arrival of the another airline flight is later than a scheduled time of arrival of the another airline flight at the next airline station;
         if the probable time of arrival of the another airline flight is not later than a scheduled time of arrival of the another airline flight at the next airline station, then displaying on the output device located at the control tower of the selected airline station a functional indicator indicating that a scheduled time of departure of the another airline flight can be delayed by the hold time; and
         if the probable time of arrival of the another airline flight is later than the scheduled time of arrival of the another airline flight at the next airline station, then:
            displaying on the output device located at the control tower of the selected airline station a functional indicator indicating the probable time of arrival of the another airline flight at the next airline station;
            generating a probable time of departure of the another airline flight from the selected airline station;
            determining if delaying the another airline flight at the selected station by the hold time will affect respective scheduled times of departure of one or more airline flights at the next airline station;
            if delaying the another airline flight at the selected station by the hold time will affect respective scheduled times of departure of one or more airline flights at the next airline station, then displaying on the output device located at the control tower of the selected airline station a functional indicator indicating the probable time of departure of the another airline flight; and
            if the hold will not affect respective scheduled times of departure of one or more airline flights at the next airline station, then displaying on the output device located at the control tower of the selected airline station a functional indicator indicating an output hold message;
      and
      instructions for if the potential missed passenger connection cannot be eliminated by delaying the another airline flight at the selected station by the hold time, then:
         reviewing one or more parameters associated with a third airline flight to facilitate the rebooking of a passenger associated with the potential missed passenger connection.

10. The system of claim 9 further comprising:
the plurality of airline stations, each of the airline stations comprising:
   a control tower; and
   an output device located at the control tower;
   wherein the first-mentioned output device is located at the control tower of the selected airline station;
and
a node comprising:
   a processor; and
   the computer readable medium;
   wherein the plurality of instructions stored in the computer readable medium is accessible to, and executable by, the processor.

11. The system of claim 10 wherein the node comprises the output device.

12. The system of claim 10 wherein each of the airline stations further comprises a user device located at the corresponding control tower, the user device comprising the corresponding output device; and
wherein the system further comprises a network via which the node is operably coupled to, and in communication with, at least the user device located at the control tower of the selected airline station.

13. The system of claim 9 wherein each airline flight in the plurality of airline flights departing from the selected airline station has a scheduled time of departure, a projected time of departure, a flight-planned block time, and a scheduled block time; and
wherein instructions for automatically providing one or more functional indicators associated with the selected airline station further comprise the following for each airline flight:
   instructions for if there is a difference between the flight-planned block time and the scheduled block time, then:
      if the flight-planned block time is shorter than the scheduled block time, then:
         generating a first target time of departure of the airline flight, comprising adding a hold time to the projected time of departure to thereby calculate the first target time of departure, the hold time equaling at least a percentage of the difference between the flight-planned and scheduled block times; and displaying on the output device a functional indicator indicating that the departure of the airline flight can depart late at the first target time of departure; and if the flight-planned block time is longer than the scheduled block time, then:

generating a second target time of departure, comprising subtracting an early time from the projected time of departure to thereby calculate the second target time of departure, the early time equaling one of the following:

the difference between the flight-planned and scheduled block times, and a maximum amount of time that is less than the difference between the flight-planned and scheduled block times; and displaying on the output device an indicator indicating that the airline flight can depart early at the second target time of departure.

14. The system of claim 9 wherein instructions for receiving data associated with the selected airline station comprise:

instructions for selecting the selected airline station;

instructions for in response to selecting the selected airline station, automatically searching for airline flights departing from the selected airline station; and instructions for loading data for the selected airline station, wherein the one or more parameters associated with the plurality of airline flights departing from the selected airline station are automatically displayed in response to loading data for the selected airline station;

wherein instructions for receiving data associated with the selected airline flight comprise:

instructions for selecting the selected airline flight from the plurality of airline flights departing from the selected airline station; and instructions for in response to selecting the selected airline flight, automatically loading data for the selected airline flight.

15. The system of claim 14 wherein the plurality of instructions further comprises:

instructions for forecasting one or more times with an operational data source and forecasting engine;

wherein the times are associated with a plurality of transportation operations, the plurality of transportation operations comprising the plurality of airline flights departing from the selected airline station;

wherein instructions for receiving data associated with the selected airline station further comprise:

instructions for issuing a query for data associated with the selected airline station using the engine; and instructions for continually updating the loaded data for the selected airline station by automatically repeating the issuance of the query at a predetermined time interval; and wherein the parameters displayed on the output device are updated at the predetermined interval.

16. A system comprising:

means for receiving data associated with an airline station selected from a plurality of airline stations;

means for in response to receiving data associated with the selected airline station, automatically outputting one or more parameters associated with the selected airline station, comprising:

means for automatically displaying on an output device one or more parameters associated with a plurality of airline flights departing from the selected airline station;

means for during outputting one or more parameters associated with the selected airline station, automatically providing one or more functional indicators associated with the selected airline station;

means for receiving data associated with an airline flight selected from the plurality of airline flights departing from the selected airline station;

and means for during outputting one or more parameters associated with the selected airline station, automatically outputting one or more parameters associated with the selected airline flight;

wherein means for automatically providing one or more functional indicators associated with the selected airline station comprises:

means for determining whether a potential missed passenger connection from the selected airline flight to another airline flight, which departs from the selected station and arrives at a next airline station, can be eliminated by delaying the another airline flight at the selected station by a hold time; and means for if the potential missed passenger connection can be eliminated by delaying the another airline flight at the selected station by the hold time, then:

generating a probable time of arrival of the another airline flight at the next airline station, the probable time of arrival being based on the hold time;

determining if the probable time of arrival of the another airline flight is later than a scheduled time of arrival of the another airline flight at the next airline station;

if the probable time of arrival of the another airline flight is not later than a scheduled time of arrival of the another airline flight at the next airline station, then displaying on the output device located at the control tower of the selected airline station a functional indicator indicating that a scheduled time of departure of the another airline flight can be delayed by the hold time; and if the probable time of arrival of the another airline flight is later than the scheduled time of arrival of the another airline flight at the next airline station, then:

displaying on the output device located at the control tower of the selected airline station a functional indicator indicating the probable time of arrival of the another airline flight at the next airline station;

generating a probable time of departure of the another airline flight from the selected airline station;

determining if delaying the another airline flight at the selected station by the hold time will affect respective scheduled times of departure of one or more airline flights at the next airline station;

if delaying the another airline flight at the selected station by the hold time will affect respective scheduled times of departure of one or more airline flights at the next airline station, then displaying on the output device located at the control tower of the selected airline station a functional indicator indicating the probable time of departure of the another airline flight; and if the hold will not affect respective scheduled times of departure of one or more airline flights at the next airline station, then displaying on the output device located at the control tower of the selected airline station a functional indicator indicating an output hold message;

and means for if the potential missed passenger connection cannot be eliminated by delaying the another airline flight at the selected station by the hold time, then:

reviewing one or more parameters associated with a third airline flight to facilitate the rebooking of a passenger associated with the potential missed passenger connection.

17. The system of claim 16 wherein each airline flight in the plurality of airline flights departing from the selected airline station has a scheduled time of departure, a projected time of departure, a flight-planned block time, and a scheduled block time; and wherein means for automatically providing one or more functional indicators associated with the selected airline station further comprises the following for each airline flight:

means for if there is a difference between the flight-planned block time and the scheduled block time, then:

if the flight-planned block time is shorter than the scheduled block time, then:

generating a first target time of departure of the airline flight, comprising adding a hold time to the projected time of departure to thereby calculate the first target time of departure, the hold time equaling at least a percentage of the difference between the flight-planned and scheduled block times; and displaying on the output device a functional indicator indicating that the departure of the airline flight can can depart late at the first target time of departure;

and if the flight-planned block time is longer than the scheduled block time, then:

generating a second target time of departure, comprising subtracting an early time from the projected time of departure to thereby calculate the second target time of departure, the early time equaling one of the following:

the difference between the flight-planned and scheduled block times, and a maximum amount of time that is less than the difference between the flight-planned and scheduled block times; and displaying on the output device an indicator indicating that the airline flight can depart early at the second target time of departure.

* * * * *